US008718976B2

(12) United States Patent
Havener et al.

(10) Patent No.: US 8,718,976 B2
(45) Date of Patent: May 6, 2014

(54) CONTROL ASSET COMPARATIVE PERFORMANCE ANALYSIS SYSTEM AND METHODOLOGY

(75) Inventors: John P. Havener, Plano, TX (US); Gregory D. Martin, Georgetown, TX (US); Russell F. Brown, Dallas, TX (US); William Horner, Dallas, TX (US); Richard B. Jones, The Woodlands, TX (US)

(73) Assignee: HSB Solomon Associates, LLC, Dallas, TX (US)

( * ) Notice: Subject to any disclaimer, the term of this patent is extended or adjusted under 35 U.S.C. 154(b) by 329 days.

(21) Appl. No.: 13/195,204

(22) Filed: Aug. 1, 2011

(65) Prior Publication Data

US 2012/0029677 A1 Feb. 2, 2012

Related U.S. Application Data

(63) Continuation of application No. 11/933,128, filed on Oct. 31, 2007, now Pat. No. 7,991,577.

(60) Provisional application No. 60/969,102, filed on Aug. 30, 2007.

(51) Int. Cl.
G06F 17/18 (2006.01)

(52) U.S. Cl.
USPC .......................................................... 702/179

(58) Field of Classification Search
USPC .................................................. 702/179–181
See application file for complete search history.

(56) References Cited

U.S. PATENT DOCUMENTS

| 6,708,137 | B2 | 3/2004 | Carley |
| 7,200,522 | B2 | 4/2007 | Mericas |
| 7,991,577 | B2 | 8/2011 | Havener et al. |
| 8,417,480 | B2 | 4/2013 | Havener et al. |
| 2003/0018450 | A1 | 1/2003 | Carley |
| 2006/0230097 | A1 | 10/2006 | Grichnik et al. |
| 2009/0031268 | A1 | 1/2009 | Miranda |
| 2009/0063094 | A1 | 3/2009 | Havener |
| 2012/0022921 | A1 | 1/2012 | Havener |
| 2013/0179233 | A1 | 7/2013 | Havener |
| 2013/0179234 | A1 | 7/2013 | Havener |

*Primary Examiner* — Manuel L Barbee
(74) *Attorney, Agent, or Firm* — Greenberg Traurig, LLP

(57) ABSTRACT

A system and method is provided for determining the variability induced on a process output. The method includes the analysis of input variable values to determine the total variability. A series of processes may be analyzed and ranked so that a process owner may gain an understanding of how a target process performs relative to the processes of other process owners. The method includes the generation of graphical process comparisons and advice regarding asset performance. The method also includes the estimation of cost impacts due to changes in induced variability.

23 Claims, 10 Drawing Sheets

FIG. 3 Development of Induced Variability Gains

CONTROL ASSET COMPARATIVE PERFORMANCE ANALYSIS SYSTEM AND METHODOLOGY

CROSS-REFERENCE TO RELATED APPLICATIONS

This application claims the benefit of U.S. Provisional Application Ser. No. 60/969,102, filed Aug. 30, 2007, which is incorporated by reference in its entirety.

This application is a continuation of U.S. Non-Provisional application Ser. No. 11/933,128, filed Oct. 31, 2007, which is incorporated by reference in its entirety.

BACKGROUND OF THE INVENTION

1. Field of the Invention

The invention relates to a system and method for measurement and comparative performance analysis of assets for production facilities.

2. Background Summary

Manufacturers make large investments in assets, e.g. personnel, instruments and equipment, field wiring, operator interfaces, automation systems, computers and software applications, to maximize profits and to improve safe operations, the benefits of which include better control of production rates, higher quality products manufactured by their production facilities with lower production risks and improved safety.

BRIEF SUMMARY OF THE INVENTION

A system and method for measurement and comparative performance analysis for production environments is provided. In a manufacturing plant, control assets can have varying degrees of success in control performance depending on several factors including but not limited to: the mechanical integrity of the process equipment being controlled, the selection of the control assets employed, the mechanical integrity of the assets, the accuracy and reliability of the data provided by the instruments, the design and control strategies used, the capabilities of the software used to express the control strategies, the skills of the people responsible for maintaining the assets, the tuning of the adjustable parameters in the software, and the tuning of the adjustable hardware setting of the final control element instruments. The manufacturing facility's production capacity, quality and yield are affected by the varying performance of the control assets.

Previously, companies have experienced a long felt and unmet need to evaluate the effectiveness of assets and to compare the performance of the assets to those employed by their competition in order to identify their competitive position, to evaluate opportunities to maximize their current investments, and to evaluate the opportunity to improve their competitive position by making new asset investments.

Overall product quality, production rates, efficiencies, and yields produced are not solely dependent on the control assets performance. In the context of a manufacturing facility, the quality of the raw materials used to produce products will also impact final product measurements. In addition, the consistency and smoothness of the operation of the facility has a direct impact on the amount of variation that is imposed on the manufacturing process. These process variations can result in lower production, lower product quality, and lower efficiency unless eliminated by the control assets.

Control assets are not capable of eliminating an infinite amount of process variation imposed by the variability of the process, but can reduce the negative impacts to the greatest extent possible. Previously, there was no systematic and universally comparable method (1) to assess control asset performance by way of measuring the effectiveness of the reduction of variation achieved by the control assets, (2) to separate the financial gains that could be achieved by improving the process variation, or (3) to determine the effectiveness to which the variation can be rejected by the control assets.

The separation of the process variation impacts from the control assets capability to reduce the impacts has important implications on the costs to improve performance. Process variation can often be reduced by low or no cost changes in operating practices and procedures, which serve to reduce the process variation if the impact of these variations can be measured and evaluated.

Low or no capital cost improvements in control performance can also be achieved by tuning existing control assets. Controls are often "de-tuned" to move less aggressively, in order to satisfy personnel's desire for slow and understandable changes. This de-tuning serves to improve acceptance of the closed loop operation of the control application mechanism, system, or device. In a manufacturing plant, operators are often empowered to put the controller in "open loop," or otherwise defeat the action of the controller, if they are uncomfortable with the aggressiveness or efficacy of the controller's actions. De-tuning typically results in lower performance and higher process variability. The degree to which operators accept aggressive tuning is individualistic. Thus, controls often have the capability to reduce variability if more aggressively tuned. In accordance with the present invention, improved tuning of the existing control assets can be achieved if the impact can be measured and effectively communicated.

Alternately, new, or upgrades to, control assets could be employed to increase performance, resulting in increased capital costs. Without separation of the process variation impact from the control performance impact, expensive investments might be made in control assets which might not result in the improvements targeted. For example, a new control application costing over one million US dollars might be installed to reduce variation when simple actions to reduce process variation and tune existing controls may have been just as effective at little or no capital cost.

Expensive new control application mechanisms, systems, and devices can also fail due to unrealistic expectations of the amount of variation reduction, resulting in disappointment and potential failure. If realistic expectations can be set initially, then a reasonable combination of operational changes and control application mechanisms, systems, or devices can be designed with realistic expectations for improvements. In accordance with the present invention, by comparing the degree of variation reduction targeted by the proposed new controls to the degree of variation reduction achieved by the leaders in the industry, a realistic expectation of improvement can be set. This can only be accomplished if the variation reduction due to controls can be separated from the degree of variation imposed by the inputs to the process.

Similarly, new control application mechanisms, systems, or devices have been installed because management felt that advanced controls must surely be required for the type of process being controlled. Management, in the absence of the objective measurements of the variability levels and reduction that is achievable through the use of the method and system according to the present invention, often thinks in terms of an "automation gap." The shorthand for this automation could be described as follows: "The competition has control assets employed that we do not, therefore we need them, too." When the expensive control investment is installed, management is disappointed to find that little improvement is achieved. Within a short time the control asset is abandoned, and the project is considered a failure. If an objective measurement of the process variability were available initially, management would have learned that the present product variation compares well with the competition despite having only simple controls. In a manufacturing plant, use of the present invention would have revealed that this is because the raw materials, operating practices, and process variation is small, resulting in little variation to be rejected, and therefore no need for expensive advanced controls.

The converse can also occur, where management has had little success with control applications, and as a result they fail to make critical control asset investments. The competition can gain a significant advantage in this case.

The separate identification, comparison, and assessment of economic opportunity allows for reduction of variation in performance. The following description is given in the context of the oil refining industry. However, the method and system are universally applicable with easy extension of the metrics and methodology into any production environment, including but not limited to: power generation and transmission; pharmaceutical manufacturing; food and beverage manufacturing; the pulp and paper industry; petrochemical manufacturing; organic and inorganic chemical manufacturing; the polymers and plastics industry; the operation of industrial, power and marine boilers; automotive manufacturing; internal combustion engine control; medical equipment manufacturing; metals and mining industry; packaging; mail and package processing; construction; project development; and transportation; as well as, a host of other industry and business applications.

According to one (or an) embodiment, a system and method is disclosed for comparative operational and process control performance analysis of industrial process units using unique algorithms, graphical presentation methods and economic gap calculations all based on reduction of process variability. While the process and manufacturing facility in several embodiments pertain to the hydrocarbon and chemical process industries, the present invention applies to control assets generally and include but are not limited to sales, marketing, transportation, project development, and construction applications as well.

Embodiments of a method relate to the various refining process unit types, including, but not limited to, crude distillation, vacuum distillation, catalytic reforming, catalytic cracking, hydrocracking, hydrotreating, and delayed coking. Direct extensions of the method in refining alone include: visbreaking, thermal cracking, hydrogen generation, hydrogen purification, MTBE production, Alkylation, Isomerization, desulfurization, sulfur recovery, tail gas recovery, sulfuric acid generation, asphalt and bitumen production, coke calcinators, desalination, CO2 liquification, cumene, cyclohexane, hydrodealkylation, toluene, xylene, paraxylene, ethybenzene, deisopenanizer, deisohexanizer, dehaptanizer, alkyate/reformate splitter, solvent deasphalting, aromatic solvent extraction, extractive distillation, calicination, and propane/propylene splitting among other refining processes.

One embodiment is a computer-implemented method for determining the amount of induced variability of variables in a process comprising the steps of: collecting a plurality of datasets of input variable values and output variable values; calculating standard deviations for each of the datasets of input variable values and output variable values; and determining induced variability of each of the datasets of output variable values.

Another embodiment is a computer-implemented method of automating the presentation of advice on process control asset performance comprising the steps of: collecting a plurality of datasets of input variable values and output variable values; calculating standard deviations for each of the datasets of input variable values and output variable values; calculating induced variability of each of the datasets of output variable values; calculating output variability of each of the datasets of output variable values; calculating a reduction in variability for at least two processes; and generating advice based on the calculated induced variability, calculated output variability, and reduction in variability of a target process.

Another embodiment is a computer-implemented method of automating the presentation of advice on control asset performance comprising the steps of: selecting a set of input variables; selecting a set of output variables, wherein the variability of the selected output variable values is affected by the variability of the selected input variable values; collecting a plurality of datasets of input variable values and output variable values for the input variables and the output variables; processing the input variable values and the output variable values to remove outliers; wherein the processing comprises: removing data errors; calculating standard deviations for each of the processed datasets of input variable values and output variable values; estimating combined variability of each of the processed datasets of input variable values; calculating induced variability of each of the processed datasets of output variable values; calculating output variability of each of the processed datasets of output variable values; calculating variability ratio for each of the processed datasets of output variable values; calculating the overall induced variability for at least four processes; calculating the overall output variability for at least four processes; calculating the overall reduction in variability for at least four processes; rank ordering the processes by overall induced variability and overall output variability; separating the processes into at least one category based on at least one overall variability, wherein the categories comprise: quartiles based on overall induced variability, and quartiles based on overall output variability; constructing a graph of the processes units with at least one category displayed, wherein the graph comprises: lines dividing the processes into quartiles by overall induced variability, lines dividing the processes into quartiles by overall output variability, and radial lines extending from the origin dividing the processes into quartiles by overall reduction in variability; displaying the overall induced variability and overall output variability of a target process on the graph; and generating advice based on the category of the target process.

Yet another embodiment is a system comprising: a server, comprising: a processor, and a storage subsystem; a database stored by the storage subsystem comprising: input and output data; a computer program stored by the storage subsystem, when executed causing the processor to: collect a plurality of datasets of input variable values and output variable values; calculate standard deviations for each of the datasets of input variable values and output variable values; and determine induced variability of each of the datasets of output variable values.

Another embodiment is a system comprising: a server, comprising: a processor, and a storage subsystem; a database stored by the storage subsystem comprising: input and output data; a computer program stored by the storage subsystem, when executed causing the processor to: collect a plurality of datasets of input variable values and output variable values; calculate standard deviations for each of the datasets of input variable values and output variable values; calculate induced variability of each of the datasets of output variable values; calculate output variability of each of the datasets of output variable values; calculate a reduction in variability for at least two processes; and generate advice based on the calculated induced variability, calculated output variability, and reduction in variability of a target process.

Another embodiment is a system comprising: a server, comprising: a processor, and a storage subsystem; a database stored by the storage subsystem comprising: input and output data; a computer program stored by the storage subsystem, when executed causing the processor to: select a set of input variables; select a set of output variables, wherein the variability of the selected output variable values is affected by the variability of the selected input variable values; collect a plurality of datasets of input variable values and output variable values for the input variables and the output variables; process the input variable values and the output variable values to remove outliers, wherein the processing comprises: removing data errors; calculate standard deviations for each of the processed datasets of input variable values and output variable values; estimate the combined variability of each of the processed datasets of input variable values using the calculated standard deviations; calculate the induced variability of each of the processed datasets of output variable values using the calculated standard deviations; calculate the output variability of each of the processed datasets of output variable values using the calculated standard deviations; calculate the variability ratio for each of the processed datasets of output variable values using the induced and output variabilities; calculate the overall induced variability for at least four processes using the induced variability of the processed datasets; calculate the overall output variability for at least four processes using the output variability of the processed datasets; calculate the overall reduction in variability for at least four processes using the induced and output variabilities; rank order the processes by overall induced variability and overall output variability; separate the processes into at least one category based on at least one overall variability, wherein the categories comprise: quartiles based on overall induced variability, and quartiles based on overall output variability; constructing a graph of the processes with at least one category displayed, wherein the graph comprises: lines dividing the processes into quartiles by overall induced variability, lines dividing the processes into quartiles by overall output variability, and radial lines extending from the origin dividing the processes into quartiles by overall reduction in variability; display the overall induced variability and overall output variability of a target process on the graph; and generate advice based on the category of the target process.

Another embodiment is a computer-implemented method for estimating energy savings for a process comprising the steps of: collecting a plurality of datasets of input variable values; calculating the standard deviations for each of the processed datasets of the input variable values; collecting a set of standard deviation benchmarks corresponding to at least one input variable; calculating a difference between the standard deviation of at least one input and at least one corresponding standard deviation benchmark; and estimating the savings related to the difference.

Another embodiment is a system comprising: a server, comprising: a processor, and a storage subsystem; a database stored by the storage subsystem comprising: input and output data; a computer program stored by the storage subsystem, when executed causing the processor to: collect a plurality of datasets of input variable values; calculate the standard deviations for each of the processed datasets of the input variable values; collect a set of standard deviation benchmarks corresponding to at least one input variable; calculate the difference between the standard deviation of at least one input and at least one corresponding standard deviation benchmark; and estimate the savings related to the difference.

BRIEF DESCRIPTION OF THE DRAWINGS

These and further features will be apparent with reference to the following description and drawings, wherein.

BRIEF DESCRIPTION OF THE TABLES

These and further features will be apparent with reference to the following description and tables, wherein:

TABLE 100 shows exemplary industry process input data parameters collected to support creation of the novel metrics of the disclosed embodiments.

TABLE 200 shows exemplary industry process output data parameters collected to support creation of the novel metrics of the disclosed embodiments.

TABLE 300 shows exemplary industry process data observation datasets of inputs and outputs output data collected to support creation of the novel metrics of the disclosed embodiments.

TABLE 400 shows exemplary induced variability gain magnitude matrix inputs and outputs for various refinery process unit types.

TABLE 500 shows exemplary automated advice that can be delivered based on the unified overall metric Vo-Vi-Vrr.

DETAILED DESCRIPTION OF EMBODIMENTS OF THE INVENTION

Unit is broadly defined as a distinct entity within a larger group, such as operating entities within a facility or business setting. Examples of units include electric power generators, chemical reactor vessels, pharmaceutical production lines, and package delivery systems.

Figure 1:
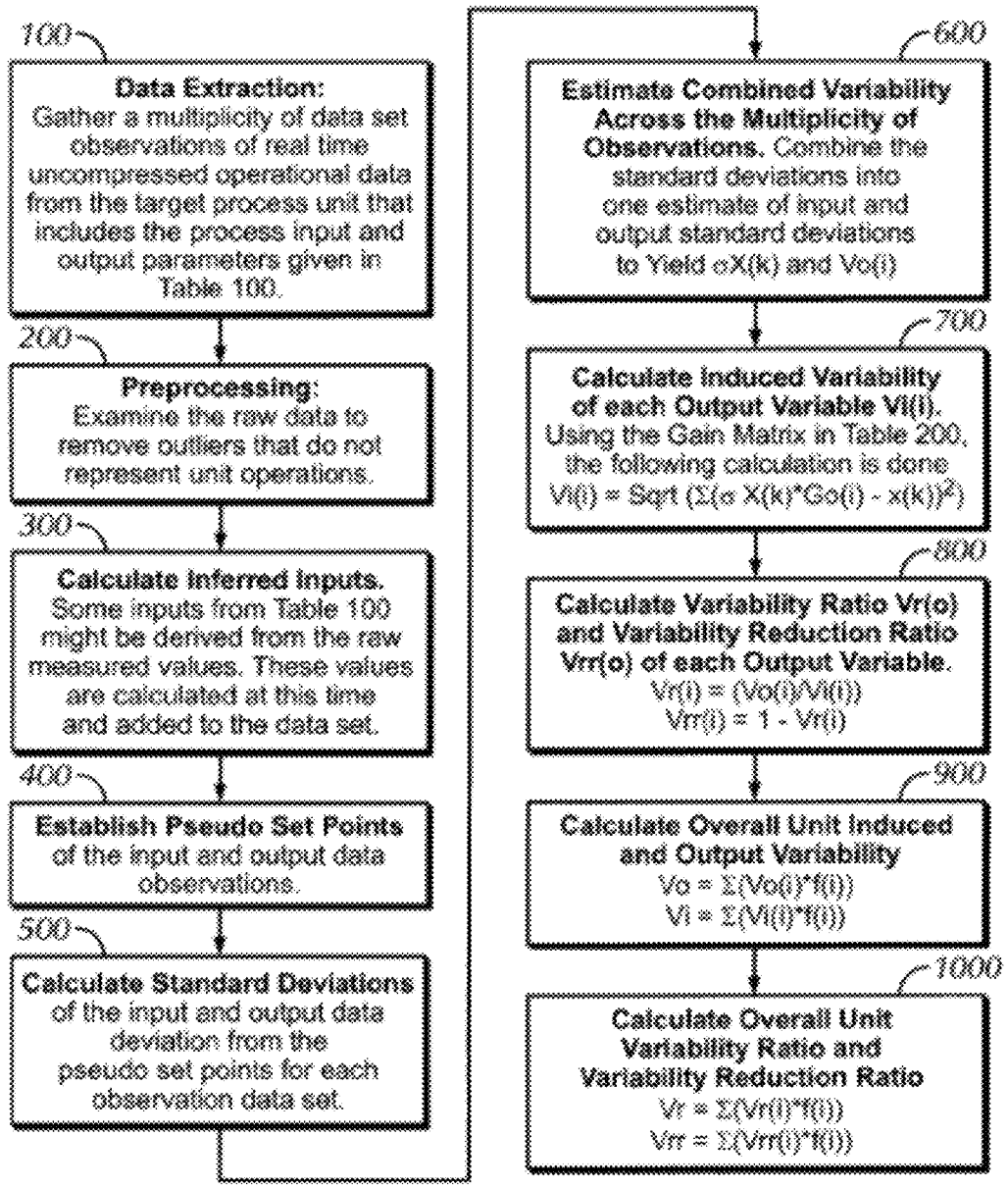
FIG. 1 is a flow chart illustrating one embodiment of a method to calculate production unit variability metrics.

One embodiment of the method, shown in FIG. 1, involves the use of a database that contains unit level process operating data for generating a comparison. The process parameters for which data is collected are identified in Table 100 and Table 200.

In step 100, historical process data are extracted for the target unit as defined in Table 100 and Table 200. The data are gathered for a multiplicity of data set observations of real-time uncompressed operational data from the target process (three or more data sets are preferred, but only one is needed). In a preferred embodiment, a minimum of three data sets are collected, each covering time frames defined in Table 300. The time frames for data collection can vary from those shown in Table 300. Data quantity can be as low as one single complete set of inputs and outputs.

A multiplicity of data sets is collected during "Normal State" operations, defined as a period of time in which the unit is operating normally without large process disturbances. One embodiment uses three data sets when the data are manually collected. For applications in which the data are collected automatically, any number of observations can be collected up to and including continuous data collection.

For crude and vacuum refining units, a second multiplicity of data sets is collected during crude switch operations, defined as that period of time in which the crude oil charge is being changed from one crude source to another, accompanied by a change in density and composition measured in API (a standard measurement of crude density) or specific gravity. These data are handled in a separate metric for crude switch performance. Note that crude switch observations can be collected for other highly affected units in a refinery, such as gas processing plants, desalters, etc. Crude and vacuum refining units have been reduced to practice.

For delayed coking units, a second multiplicity of data sets is collected during drum switch operations, defined as that period of time in which the coking drum, which feeds the main fractionator is being switched from one drum to another. These data are handled in a separate metric for drum switch performance.

In step 200, the data are examined and preprocessed to assure the input information is valid. This step includes analysis of the values to assure the values are reasonable, the values are of the right order of magnitude, and the raw process data do not contain instrumentation or data recording abnormalities such as "spikes." Spikes are events in which the data for one observation show an inordinately large or small reading and immediately return to a reasonable range. If the abnormality indicates a change that is physically impossible for an actual operating unit to have actually experienced, then the spike data reading is eliminated from the dataset. If the data values in general are not reasonable values, then the operating unit which supplied the data is contacted to assure that the correct process parameters were used. Preprocessing can be done by automated checks, or can be done manually. In either case, an individual with industry experience is generally used to assure the reasonableness of the data either by personal review of the data, or use of automated logic created by the individual with industry experience.

Not all inputs are measured by the industry. Some inputs might be derived or inferred from data that is normally recorded. These readings are called inferred inputs. In step 300, inferred input values are calculated. Some of these inferred values are industry standard calculations such as liquid hourly space velocity (LHSV) (calculated from reactor dimensions and process flow rates) and catalyst loadings (the density of the catalyst loaded into the reaction vessel as collected from the unit log data from the operations personnel). Other parameters such as API could be measured online but typically are not measured. Another embodiment is used to infer API, which is described below.

In step 400, pseudo set points of the input and output data observations are established and added to the data set. Typically the industry does not maintain a long term record of set points used. Operating units typically record the actual process values, but not the set points. For industries that maintain a history of the set points, set points are preferred for use. However, if the set points are not recorded then they are estimated. There are several methods that can be used to estimate set points. A few of those are given below:

1. Use actual recorded set points if they exist.
2. Use controller statistics that are recorded by the control application or external software applications.
3. Use the average value of the data during the observation period as the estimate of the set point. This typically introduces only small errors in that set points should not be changed minute to minute. The observations are collected during "normal state" in which few major process changes are being introduced.
4. Use the running average of the data as the set point. This poses some problems for the dynamics.
5. Use a running average to detect set point changes, and then divide the observation into time segments with different set points. For each segment use the average of all data in that segment as the set point estimate.
6. Visually scan the data and assign set points manually.

This list of methods is illustrative and exemplary only. To assure equal treatment among all participants, since few have the set point information, method 3 above is preferred. However, when set point information is more common in a field or process, method 1 above would be preferred.

In step 500, the standard deviations of the input and output data deviation from the pseudo set points for each variable in each observation data set are calculated.

In step 600, an estimate of the combined variability across the multiplicity of observations is calculated. This is done by combining the standard deviations from the multiplicity of observations into one estimate of input and output standard deviations to yield $\sigma X_{(k)}$ and $Vo(i)$. This combination may be accomplished by several methods. The methods below are illustrative and exemplary only.

1. $\sigma X_k = \mathrm{Sqrt}(((\sigma X_{k1})^2 + (\sigma X_{k2})^2 + \ldots + (\sigma X_{kn})^2))/n)$    (I-1)

Where $\sigma X_k$ = the standard deviation of input $X_k$.
$\sigma X_{kn}$ = the standard deviation of input $X_k$ for observation period n.
n = the total number of observation periods 1 . . . n
Note that when comparing similar unit operations, equation I-1 is preferred. For comparing operations that are dissimilar and might have values of X that are an order of magnitude different between various operating units in the population, then the coefficient of variation of the input parameter $\sigma X_k$: [$\sigma X_k$/Average $X_k$] should be used.

2. $Vo(i) = \mathrm{Sqrt}(((\sigma Y_{k1})^2 + (\sigma Y_{k2})^2 + \ldots + (\sigma Y_{kn})^2)/n)$    (I-2)

Where Vo(i)=the "Output variability"=Standard deviation of output variable Yi. Which equals $\sigma Y_i$.

$\sigma Y_{in}$=the standard deviation of output Y, for observation period n.

Note that when comparing similar unit operations, equation I-2 is preferred. For comparing operations that are dissimilar and might have values of Y that are an order of magnitude different, then the coefficient of variation of the output parameter $Y_i$: $[\sigma Y_i/\text{Average} Y_i]$ should be used.

Figure 2:
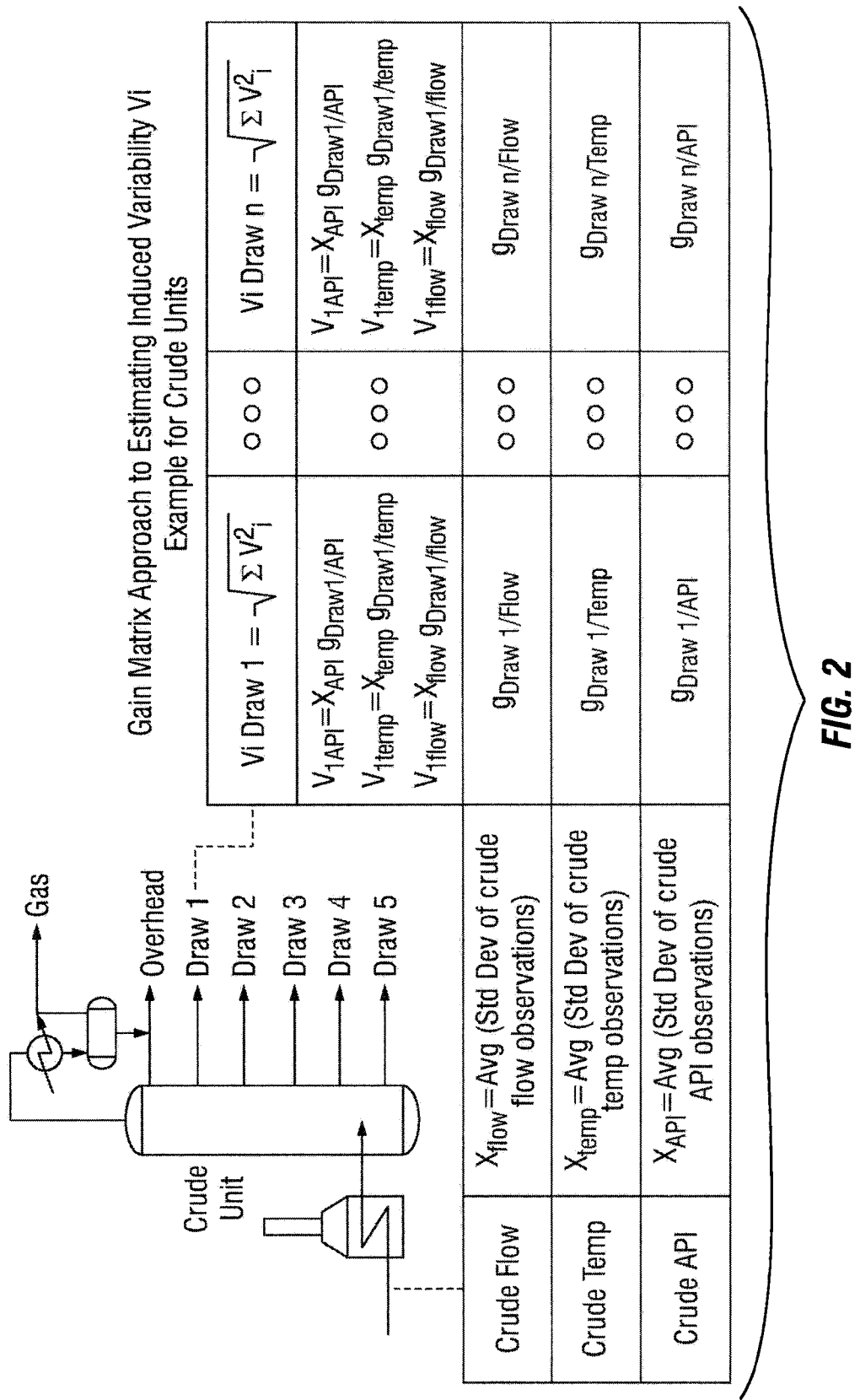
FIG. 2 is a diagram of one embodiment of an induced variability gain magnitude matrix construction for a crude unit. Similar induced variability gain magnitude matrix constructions have been reduced to practice for all major refinery process units. Similar constructions are contemplated for all major process units in all continuous and discontinuous process operations.

In step 700, the Induced Variability Vi(i) of each Output Variable i is calculated. This is done using a novel Gain Matrix which estimates the variability of product measurements from the standard deviation of the input variables $\sigma X_k$. An example gain matrix for a crude unit is given in FIG. 2. A unique gain matrix can be developed for each unit type. Only the crude unit gains are given as an example. An example of the gains used in the gain matrix for the example crude unit in FIG. 2 is given in Table 400.

The methods to develop gains according one embodiment are described herein. The use of a gain magnitude matrix, which estimates product variations from inducing parameter varisations, is a new and novel approach. It is also convenient that the gains used are very similar to the gain values common in linear control applications, where the magnitude is taken of each gain for the purpose of estimating output variability, which is always non-negative. It is important to note that, unlike gain matrix applications in practice today for control applications (superposition of linear systems which adds the gain-multiplied contributions), the individual contributions from the gain magnitude calculations are not summed directly. Instead, according an embodiment, the individual contributions are squared and summed appropriately taking into account any correlation that may exist between inputs. The square root of the sum is then taken. This approach may be referred to as "the weighted variance approach."

$Vi_i$ is defined as the induced variability standard deviation of product output "i" of interest. It is an estimate of the amount of variability that is being caused by the variability of selected inputs to the process unit and:

$$Vi_i = \left[\sum_{k=1}^{n} G_{o_i-x_k}^2 * \sigma_{x_k}^2 + 2\sum_{l=1}^{n}\sum_{j<l}^{n} G_{o_i-x_l} G_{o_i-x_j} * \sigma_{x_l,x_j}\right]^{1/2} \quad \text{(I-5)}$$

where:

$G_{o_i-x_k}$=gain magnitude of the unit product output i interest to the standard deviation of input inducing parameter $X_k$.

$\sigma^2 x_k$=variance of input $X_k$ $\sigma X_l, X_j$=covariance between inputs $X_l$ and $X_j$ If the inputs, $X_l$ and $X_j$, are independent and subsequently uncorrelated observation, then:

$$Vi_i = \left[\sum_{k=1}^{n} G_{o_i-x_k}^2 * \sigma_{x_k}^2\right]^{1/2} \quad \text{(I-5A)}$$

As an illustration, Vi could be an estimate of the amount of variability that is induced upon an output product property of interest by the variability of the key process inputs.

In step 800, the dimensionless Variability Ratio Vr(o) and Variability Reduction Ratio Vrr(o) of each output variable of interest is calculated.

$$Vr_i = (Vo_i/Vi_i) \quad \text{(I-6)}$$

$$Vrr_i = 1 - Vr_i \quad \text{(I-7)}$$

Where $Vr_i$=Variability Ratio of output product property of interest i.

$Vrr_i$=Variability Reduction Ratio of output product property of interest i.

Note that Vr and Vrr are dimensionless numbers as all units cancel out in the division. Dimensionless numbers have special qualities for benchmarking as dimensionless measurements of units of any capacity or size can be directly compared.

These two novel dimensionless parameters have specific meanings. Vr is the fraction of the induced variability that remains in the product. Vrr is the fraction of the induced variability that has been removed by the unit controls. The preferred method is to use Vrr as higher values relate to better control asset performance. However, all calculations can be performed using Vr alone, since Vr introduces no artificial constant and therefore retains its dimensionless nature throughout the analysis. The constant can interfere with some uses of the measure, however, Despite this limitation, Vrr is the preferred metric for communication to management, since it does not require the audience to think in reverse terms.

The estimation of Vi and Vrr allows the separate analysis and management of control action from process induced variability on a stream-by-stream, property-by-property basis regardless of the size of the units being compared.

In step 900, the overall unit output variability performance metric is calculated. Although the product stream by stream and attribute by attribute metrics are very useful for diagnosis of methods to improve unit operations, management has need of an overall performance metric to help understand and compare the overall unit performance to competition. This is accomplished with the overall Vo metric and Vi metrics.

$$Vo = (Vo_1 * f_1 + Vo_2 * f_2 + \ldots + Vo_1 * f_1) \quad \text{(I-8)}$$

$$Vi = (Vi_1 * f_1 + Vi_2 * f_2 + \ldots + Vi_i * f_i) \quad \text{(I-9)}$$

Where Vo=overall unit output product variability achievement.

Vi=overall unit calculated induced variability $Vo_i$=average standard deviation of the measured output variability observations on stream i $Vi_i$=average standard deviation of the calculated output variability imposed by process variation observations on stream i $f_i$=fraction of the product stream to the agglomerated total production of interest. This can be mass fraction or volume fractions of the total production of interest. The preferred embodiment is the volume fraction as volumes are directly measured but mass requires conversion of the measured values using an approximated density that introduces errors.

Vo is the main metric for comparing units overall performance.

Vi is the main metric to compare the amount of variability induced by process operations.

Another embodiment incorporates the importance factors by product variable based on economics or other criteria. This is a simple extension of the weights used.

Another embodiment uses the square root of the sum of the squares approach combined with the weighted average as given in the equations below:

$$Vo = (Vo_1^2 * f_1 + Vo_2^2 * f_2 + \ldots + Vo_1^2 * f_1)^{0.5} \quad \text{(I-8A)}$$

$$Vi = (Vi_1^2 * f_1 + Vi_2^2 * f_2 + \ldots + Vi_i^2 * f_i)^{0.5} \quad \text{(I-9A)}$$

Of course equation I-8A and I-9A honor the fact that the Vo and Vi are standard deviations.

In step 1000, the overall unit variability ratio Vr and variability reduction ratio Vrr are calculated. Although the product stream by stream and attribute by attribute metrics are very useful for diagnosis of methods to improve unit operations, management has need of an overall control performance metric to help understand and compare the overall unit control performance of the process unit to competition. This is accomplished with the overall Vr and Vrr metrics.

$$Vr = (Vr_1 * f_1 + Vr_2 * f_2 + \ldots + Vr_i * f_i) \quad (I\text{-}10)$$

$$Vrr = 1 - Vr \quad (I\text{-}11)$$

Where Vr=overall variability ratio, an estimate of the fraction of induced variability that remains in the product.
Vrr=overall variability reduction ratio, an estimate of the fraction of the induced variability that has been removed from the product by the unit controls.
$f_i$=fraction of the product stream i to the agglomerated total production of interest.

Vrr is the preferred embodiment of the main metric for comparing units overall control performance. As stated previously, Vr can alternately be used for the same purpose, but must be understood to be the inverse of the efficacy of the controls. Alternate embodiments include the incorporation of importance factors by product parameter based on economics or other criteria.

An alternate embodiment of equation I-10 is to use the square root of the sum of the squares approach given in the equations below:

$$Vr = (Vr_1^2 * Mf_1 + Vr_2^2 * Mf_2 + \ldots + Vr_i^2 * Mf_i)^{0.5} \quad (I\text{-}10A)$$

Figure 3:
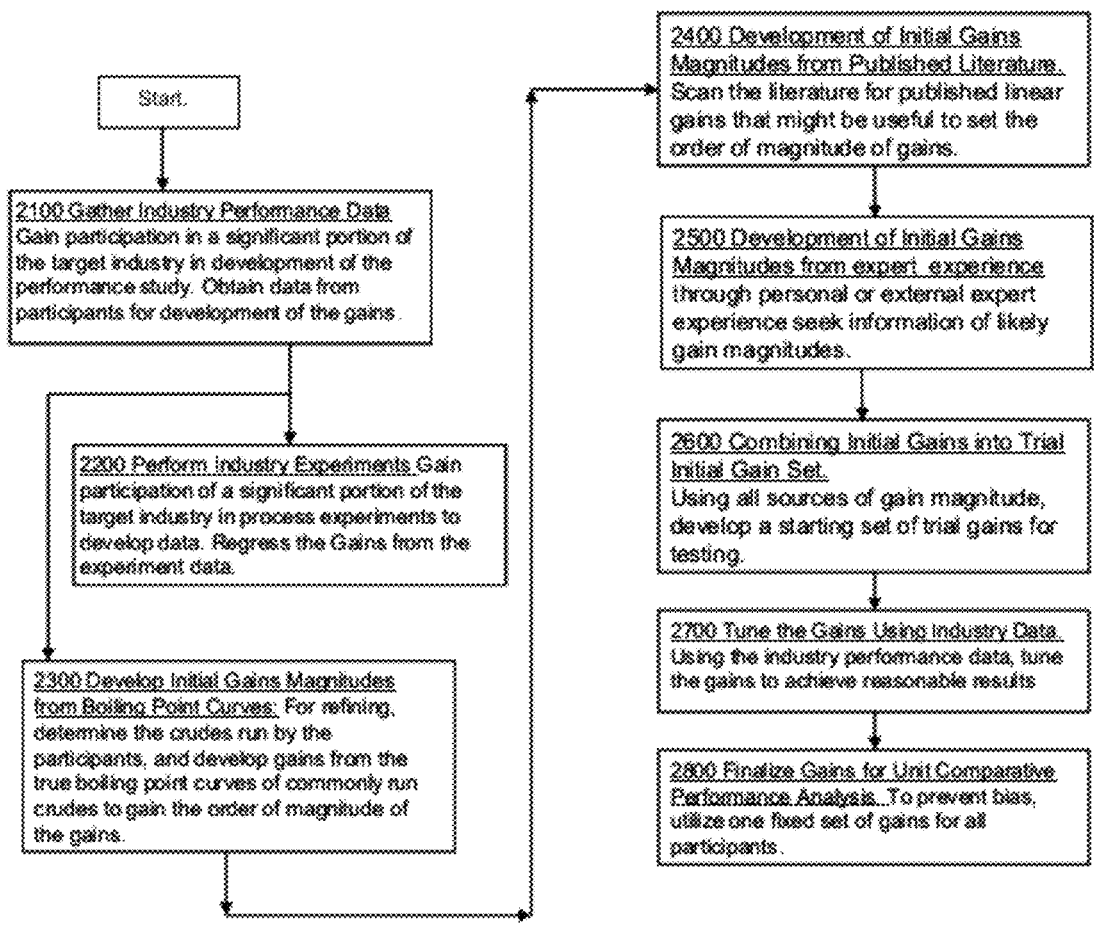
FIG. 3 is a flow chart of an embodiment of a method to calculate the gain magnitude values in any induced variability gain matrix.

In FIG. 3, the process for development of the key induced variability gains is described. The process involves gathering multiple sources of information to establish the order of magnitude of the gains, developing a trial gain set, and then tuning the trial gain by testing the calculated Vi against industry data. A final gain set is then established, which is used for all study participants.

In step 2100, participation from a significant portion of the target industry is sought to gather the operational data that will be required to obtain the gains. Step 2200, which is impractical in continuous, large production processes but may be effective in discrete manufacturing, is the step of requesting that industry obtain a training signal set of data for development of the Vi gains directly. In step 2100, industry is asked to put all present controllers in open loop and take no operator actions to reject disturbances for a period of time to collect the data needed to directly determine the actual gains between input disturbances and output production. Various levels of deliberately introduced input disturbance might also be required. The data collected from such experiments creates a measured true collected Vi signal to train a model against. This creates a solid training signal. Step 2200 would be very expensive for industry since it could produce low quality production and might be unsafe to operate in the requested manner. For these reasons, step 2200 is not the preferred method for continuous, large production processes and may be skipped in those circumstances.

When step 2200 is impractical, it must be realized that no actual training signal exists to allow the Vi gains to be directly calculated. Therefore, the Vi gains must be estimated or inferred. This is done by gathering multiple sources of information from which to construct an estimate of the order of magnitude of the gains, and then testing the gains by calculating induced variability and checking the reasonableness of the results.

In step 2300, a more reasonable approach is taken. Participation from a significant portion of the target industry is sought to gather normal operating data with the unit controllers in action. For the refining industry units, these data are defined in Table 300. The parameters to be captured are given in Table 100 and Table 200. The gains to be developed between the Inputs in Table 100 and the Outputs in Table 200 for one embodiment are disclosed. Participants are asked to gather the data and submit it for assembling an industry wide testing data set. When a reasonable result with one set of gains that produces reasonable results for all participants in the industry training set is obtained, it will be the gain set employed.

Figure 4:
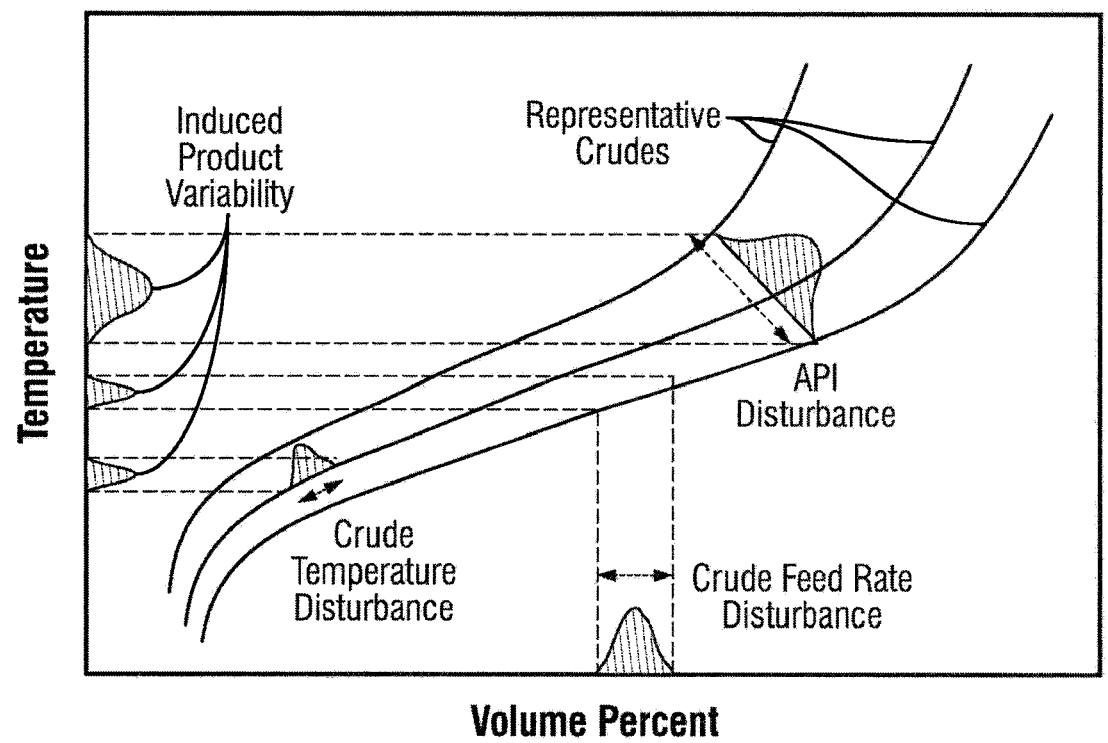
FIG. 4 is a diagram illustrating an embodiment of a method to obtain initial estimates of variability gains by examination of the boiling point curves of various refinery crude feeds.

In step 2300, participating refineries' crude slates are examined and a representative sampling of, for example, three to five crudes are selected for development of initial gain magnitudes. The initial gain magnitudes are calculated from examination of the boiling point curves of the representative crudes as shown in FIG. 4.

In step 2400, the literature is searched for reported gains from the inputs to the outputs used in actual installed industry controllers. These gains are most often obtained from step tests. Since the induced variability gains should be very similar to the controller process control gains, the magnitudes of these process gains can be used as one estimate of the gain magnitudes for the induced variability gains in this analysis.

In step 2500, personal expert experience of operators and operations personnel is consulted to develop estimates of gain magnitudes. In such interviews the expert may be asked questions such as the following: "If you were to increase the crude feed rate by 5,000 bpd and you did not increase the Naphtha draw rate, how much do you think the Naphtha draw temperature would rise?" These anecdotal responses are tabulated to determine the approximate magnitude of the gain. The above question is an example only of the process of interviewing the expert.

In step 2600, all of the various sources of gain magnitudes from steps 2100 through 2500, including those from other sources are examined to develop an initial starting trial set of gains for testing against the representative industry process data.

In step 2700, the initial trial gains are tuned by successive testing and modification against the entire data set of collected representative industry process data created in step 2200. In this process, outlier results for the estimate of Vi, Vr, and Vrr are examined to determine which input is most responsible for the error. These are adjusted within the reasonable bounds of the gains established in step 2600.

Once step 2700 has been repeated until the developer is satisfied that the best possible gains has been established, then, in step 2800, a single set of gains is established as the analysis gain set, and this set is applied to all participating process units. This is the preferred method to provide reasonable and comparable results to all industry participants. An alternate embodiment is to calculate a unique gain set for each and every participating process unit, or unique gains for any selected subset of process units.

Development of Inferred Values

Inferred values provide input values that are key concepts that are not typically measured directly by instruments in the industry, but can be calculated from measurement that are recorded. These can be well established first principle concepts, laws of physics, well established engineering design and analysis parameters, or novel or new concepts or calculations that prove useful in estimation of variability of the output products.

By way of example of inferred values, examine Table 100, which identifies several inferred values. Table 100 serves as an example only of the use of inferred values that will be applied in other unit operations or other industries in addition to refining.

For reformers and hydrotreaters, the well established principle of reactor liquid hourly space velocity (LHSV) is an inferred input. The calculation of LHSV is well established in the industry and need not be explained here. It is calculated from reactor dimensions and catalyst loading and reactor feed rates which are measured and recorded.

For hydrocrackers and hydrotreaters, the Weighted Average Bed Temperature (WABT) is an inferred input, and the calculation of WABT is well established in the industry. Often WABT is recorded directly from calculations done in the distributed control system or reactor temperature controllers; however, if the WABT is not directly available, then the WABT can be calculated from the individual reactor bed temperatures that are recorded.

For Reformers, the Weighted Average Inlet Temperature (WAIT) of the reactors is an inferred input, and the calculation is well established in the industry. Often WAIT is recorded directly from calculations done in the distributed control system or reactor temperature controllers; however, if the WAIT is not directly available, then the WAIT can be calculated from the individual reactor inlet temperatures which are recorded.

For Crude and Vacuum Units, the API or density of the unit feed can be measured on-line but seldom is measured on-line in industry practice. The API is a rough measurement of the composition of the unit feed, and therefore is an important input affecting the product variation and therefore should be inferred if not directly measured.

The basic concept for the invention of the API standard deviation inferred value is to use the flow and temperature readings of the column itself as data from a large on-line analyzer. Each column side draw has a known product class, a typical draw tray temperature under atmospheric column pressure, and a known API range. As the volume fractions of these draws change, and the tray temperatures change, there is an implied change in the crude feed composition to the unit that was required to produce these changes in distillation products.

There are three complications that make it impractical to develop the standard deviation of API directly from the above standard industry knowledge: 1) the overhead and base flows are not considered, only the side draw flows are given, thus the mass balance to the crude feed is incomplete; 2) we are predicting the standard deviation of variation in API, not the API and covariance can occur; and 3) the action of the side draw product controllers is to manipulate the volume percent of the draws to maintain target properties, and thus the controllers themselves contribute to the variation.

These complications require then a empirical correlation rather than a straight forward calculation based on first principles knowledge. These correlations were developed by a combination of first principles knowledge and regression against industry data on scores of atmospheric and vacuum units. The results have proved to be robust.

First we will describe the crude unit crude feed API standard deviation inferred value, then describe the vacuum unit atmospheric tower bottoms feed API standard deviation inferred value. The crude unit feed API variation is inferred from the standard deviations of the draw tray temperatures and flows of the column side streams as given in the equations below.

$$\sigma V_{API(1)} = f_{(1)}(3.312\text{E-}06 \sigma X^2_{temp(1)} + 0.06644 \sigma X_{temp(1)} + (\sigma X_{temp(1)} * \sigma X_{flow(1)})) \quad \text{(II-1)}$$

$$\sigma V_{API} = (\sigma V_{API(1)} + \sigma V_{API(2)}, + \ldots + \sigma V_{API(1)}) \quad \text{(II-2)}$$

Where $\sigma V_{API}$ = The inferred standard deviation of crude feed API.

$\sigma V_{API(1)}$ = The inferred contribution to the standard deviation of the crude feed due to the standard deviation of the API of side stream (1) product.

$\sigma X_{temp(1)}$ = The standard deviation of the draw tray temperature of side stream (1) product.

$\sigma X_{flow(1)}$ = The standard deviation of the draw flow of side stream (1) product.

$f_{(1)}$ = The fraction of side stream product (1) of the sum of all side stream products.

Note that the sum does not include overhead gas or atmospheric tower bottoms flow.

The standard deviation of the API of the atmospheric tower bottoms feed to a vacuum unit is inferred from the standard deviations of the draw tray temperatures and flows of the vacuum column side streams as given in the equation below.

$$\sigma V_{API(1)} = f_{(1)}(0.00002 \sigma X^2_{temp(1)} + 0.0427 \sigma X_{temp(1)} + (\sigma X_{temp(1)} * \sigma X_{flow(1)})) \quad \text{(II-3)}$$

$$V_{API} = \Sigma \sigma V_{API(1)} \quad \text{(II-4)}$$

Where $\sigma V_{API}$ = The inferred contribution to the standard deviation of the crude feed due to the standard deviation of the API of side stream (1) product.

$\sigma V_{API(1)}$ = The inferred standard deviation of API of side stream (1) product.

$\sigma X_{temp(1)}$ = The standard deviation of the draw tray temperature of side stream (1) product.

$\sigma X_{flow(1)}$ = The standard deviation of the draw flow of side stream (1) product.

$f_{(1)}$ = The fraction of side stream product (1) of the sum of all side stream products. Note that the sum does not include overhead gas or vacuum tower bottoms flow.

Although the preceding examples are for specific inferred inputs for specific units in refining, they are illustrative and exemplary, and additional inferred calculations may be used for input values.

Calculation of Performance Metrics and Gaps

The calculated standard deviations of all input, output, and variables from step 500 in FIG. 1 are gathered from all industry participating units. In addition, the overall performance parameters, Vo, Vi, Vr, and Vrr are gathered, along with the individual stream performance parameters $Vo_i$, $Vi_i$, and $Vrr_i$. All of these are arranged in ascending order and divided into quartiles with Quartile 1 having the lowest variation and therefore the best performance. The average of all values in Quartile 1 is calculated as the base line for comparison. A performance gap is calculated for each input and output variable as the difference between the individual standard deviation and the Quartile 1 average. The use of the Quartile 1 average is the preferred embodiment, however the difference to the combined Quartile 1 and 2 average (top half average) and the difference to the study average (average of all values) can also be calculated and reported. While quartiles are used in this embodiment, and are common in some industries, the overall and individual performance parameters may be separated into any number of divisions.

Individual Input Variability Metrics $$Q1\sigma X_k = \text{Average } \sigma X_k \text{ of lowest 25\% of collected } \sigma X_k \quad \text{(III-1)}$$

$$Q2\sigma X_k = \text{Average } \sigma X_k \text{ of } 2^{nd} \text{ lowest 25\% of the collected } \sigma X_k \quad \text{(III-2)}$$

$Q3\sigma X_k$=Average $\sigma X_k$ of $2^{nd}$ highest 25% of the collected $\sigma X_k$ (III-3)

$Q4\sigma X_k$=Average $\sigma X_k$ of the highest 25% of the collected $\sigma X_k$ (III-4)

Top3$\sigma X_k$=Average $\sigma X_k$ of the lowest three collected $\sigma X_k$ (III-5)

TopHalf$\sigma X_k$=Average $\sigma X_k$ of lowest 50% of the collected $\sigma X_k$ (III-6)

Average$\sigma X_k$=Average $\sigma X_k$ of all collected $\sigma X_k$ (III-7)

Individual Input Variability Gaps

Gap$\sigma X_k$=$\sigma X_k$–Selected Variability Metric from (III-1 to III-7). (III-8)

The preferred embodiment of Gap$\sigma X_k$ is to use the $Q1\sigma X_k$, for overall gap, and to use the others to create intermediate gap closure goals.

Individual Output Variability Metrics $Q1Vo_i$=Average $Vo_i$ of lowest 25% of collected $Vo_i$ (III-9)

$Q2Vo_i$=Average $Vo_i$ of $2^{nd}$ lowest 25% of the collected $Vo_i$ (III-10)

$Q3Vo_i$=Average $Vo_i$ of $2^{nd}$ highest 25% of the collected $Vo_i$ (III-11)

$Q4Vo_i$=Average $Vo_i$ of the highest 25% of the collected $Vo_i$ (III-12)

Top3$Vo_i$=Average $Vo_i$ of the lowest three collected $Vo_i$ (III-13)

TopHalf$Vo_i$=Average $Vo_i$ of lowest 50% of the collected $Vo_i$ (III-14)

Average$Vo_i$=Average $Vo_i$ of all collected $Vo_i$ (III-15)

Individual Output Variability Gaps

Gap$Vo_i$=$Vo_i$–Selected Individual Metric from (III-9 to III-15). (III-16)

The preferred embodiment of Gap$Vo_i$ is to use the $Q1Vo_i$, and to use the others to create intermediate gap closure goals.

Individual Output Metrics—Variability Ratio $Vr_i$.

$Q1Vr_i$=Average $Vr_i$ of lowest 25% of collected $Vr_i$ (III-17)

$Q2Vr_i$=Average $Vr_i$ of $2^{nd}$ lowest 25% of the collected $Vr_i$ (III-18)

$Q3Vr_i$=Average $Vr_i$ of $2^{nd}$ highest 25% of the collected $Vr_i$ (III-19)

$Q4Vr_i$=Average $Vr_i$ of the highest 25% of the collected $Vr_i$ (III-20)

Top3$Vr_i$=Average $Vr_i$ of the lowest three collected $Vr_i$ (III-21)

TopHalf$Vr_i$=Average $Vr_i$ of lowest 50% of the collected $Vr_i$ (III-22)

Average$Vr_i$=Average $Vr_i$ of all collected $Vr_i$ (III-23)

Individual Variability Ratio Gaps

Gap$Vr_i$=$Vr_i$–Selected Individual Metric from (III-17 to III-23). (III-24)

The preferred embodiment of Gap$Vr_i$ is to use the $Q1Vr_i$, and to use the others to create intermediate gap closure goals.

Individual Output Metrics—Variability Reduction Ratio $Vrr_i$.

$Q1Vrr_i$=Average $Vrr_i$ of lowest 25% of collected $Vrr_i$ (III-25)

$Q2Vrr_i$=Average $Vrr_i$ of $2^{nd}$ lowest 25% of the collected $Vrr_i$ (III-26)

$Q3Vrr_i$=Average $Vrr_i$ of $2^{nd}$ highest 25% of the collected $Vrr_i$ (III-27)

$Q4Vrr_i$=Average $Vrr_i$ of the highest 25% of the collected $Vrr_i$ (III-28)

Top3$Vrr_i$=Average $Vrr_i$ of the lowest three collected $Vrr_i$ (III-29)

TopHalf$Vrr_i$=Average $Vrr_i$ of lowest 50% of the collected $Vrr_i$ (III-30)

Average$Vr_i$=Average $Vrr_i$ of all collected $Vrr_i$ (III-31)

Individual Variability Reduction Ratio Gaps

Gap$Vrr_i$=$Vrr_i$–Selected Individual Metric from (III-25 to III-31). (III-32)

The preferred embodiment of GapVrr$_i$ is to use the $Q1Vrr_i$, and to use the others to create intermediate gap closure goals.

Overall Unit Performance Metrics—Induced Variability $Q1Vi$=Average $Vi$ of lowest 25% of collected $Vi$ (III-33)

$Q2Vi$=Average $Vi$ of $2^{nd}$ lowest 25% of the collected $Vi$ (III-34)

$Q3Vi$=Average $Vi$ of $2^{nd}$ highest 25% of the collected $Vi$ (III-35)

$Q4Vi$=Average $Vi$ of the highest 25% of the collected $Vi$ (III-36)

Top3$Vi$=Average $Vi$ of the lowest three collected $Vi$ (III-37)

TopHalf$Vi$=Average $Vi$ of lowest 50% of the collected $Vi$ (III-38)

Average$Vi$=Average $Vi$ of all collected $Vi$ (III-39)

Overall Induced Variability Gaps

Gap$Vi$=$Vi$–Selected Individual Metric from (III-33 to III-39). (III-40)

The preferred embodiment of GapVi is to use the Q1Vi, and to use the others to create intermediate gap closure goals.

Overall Unit Performance Metrics—Output Variability $Q1Vo$=Average $Vo$ of lowest 25% of collected $Vo$ (III-41)

$Q2Vo$=Average $Vo$ of $2^{nd}$ lowest 25% of the collected $Vo$ (III-42)

$Q3Vo$=Average $Vo$ of $2^{nd}$ highest 25% of the collected $Vo$ (III-43)

$Q4Vo$=Average $Vo$ of the highest 25% of the collected $Vo$ (III-44)

Top3$Vo$=Average $Vo$ of the lowest three collected $Vo$ (III-45)

TopHalf$Vo$=Average $Vo$ of lowest 50% of the collected $Vo$ (III-46)

Average$Vo$=Average $Vo$ of all collected $Vo$ (III-47)

Overall Output Variability Gaps $$GapVo = Vo - \text{Selected Individual Metric from (III-41 to III-47)}. \quad \text{(III-48)}$$

The preferred embodiment of GapVo is to use the Q1Vo, and to use the others to create intermediate gap closure goals.

Overall Unit Performance Metrics—Variability Ratio $$Q1Vr = \text{Average } Vr \text{ of lowest 25\% of collected } Vr \quad \text{(III-49)}$$

$$Q2Vr = \text{Average } Vr \text{ of } 2^{nd} \text{ lowest 25\% of the collected } Vr \quad \text{(III-50)}$$

$$Q3Vr = \text{Average } Vr \text{ of } 2^{nd} \text{ highest 25\% of the collected } Vr \quad \text{(III-51)}$$

$$Q4Vr = \text{Average } Vr \text{ of the highest 25\% of the collected } Vr \quad \text{(III-52)}$$

$$Top3Vr = \text{Average } Vr \text{ of the lowest three collected } Vr \quad \text{(III-53)}$$

$$TopHalfVr = \text{Average } Vr \text{ of lowest 50\% of the collected } Vr \quad \text{(III-54)}$$

$$AverageVr = \text{Average } Vr \text{ of all collected } Vr \quad \text{(III-55)}$$

Overall Variability Ratio Gaps $$GapVr = Vr - \text{Selected Individual Metric from (III-49 to III-55)}. \quad \text{(III-56)}$$

The preferred embodiment of GapVr is to use the Q1Vr, and to use the others to create intermediate gap closure goals.

Overall Unit Performance Metrics—Variability Reduction Ratio Vrr $$Q1Vrr = \text{Average } Vrr \text{ of lowest 25\% of collected } Vrr \quad \text{(III-57)}$$

$$Q2Vrr = \text{Average } Vrr \text{ of } 2^{nd} \text{ lowest 25\% of the collected } Vrr \quad \text{(III-58)}$$

$$Q3Vrr = \text{Average } Vrr \text{ of } 2^{nd} \text{ highest 25\% of the collected } Vrr \quad \text{(III-58)}$$

$$Q4Vrr = \text{Average } Vrr \text{ of the highest 25\% of the collected } Vrr \quad \text{(III-59)}$$

$$Top3Vrr = \text{Average } Vrr \text{ of the lowest three collected } Vrr \quad \text{(III-60)}$$

$$TopHalfVrr = \text{Average } Vrr \text{ of lowest 50\% of the collected } Vrr \quad \text{(III-61)}$$

$$AverageVrr = \text{Average } Vrr \text{ of all collected } Vrr \quad \text{(III-62)}$$

Overall Variability Reduction Ratio Gaps $$GapVrr = Vrr - \text{Selected Individual Metric from (III-57 to III-62)}. \quad \text{(III-63)}$$

The preferred embodiment of GapVrr is to use the Q1Vrr, and to use the others to create intermediate gap closure goals.

In addition to the standard deviations Quartiles 1 given in the above paragraph, some process parameter average values can be similarly divided into quartiles and reported back to participants. This is not the preferred practice as the average values represent the set point setting and are considered proprietary by study participants. One exception to this is the column pressure of atmospheric crude units and vacuum units. These parameters averages can be reported back as higher pressure causing the distillation to be more difficult and less energy efficient. In reporting back the pressures, it is important to divide the industry data into process types. In particular for vacuum unit there are two main types (wet and dry vacuum units). The pressures can only be compared with like types of vacuum units.

Column Pressure (P) Metrics $$Q1P = \text{Average } P \text{ of lowest 25\% of collected } P \quad \text{(III-64)}$$

$$Q2P = \text{Average } P \text{ of } 2^{nd} \text{ lowest 25\% of the collected } P \quad \text{(III-65)}$$

$$Q3P = \text{Average } P \text{ of } 2^{nd} \text{ highest 25\% of the collected } P \quad \text{(III-66)}$$

$$Q4P = \text{Average } P \text{ of the highest 25\% of the collected } P \quad \text{(III-67)}$$

$$Top3P = \text{Average } P \text{ of the lowest three collected } P \quad \text{(III-68)}$$

$$TopHalfP = \text{Average } P \text{ of lowest 50\% of the collected } P \quad \text{(III-69)}$$

$$AverageP = \text{Average } P \text{ of all collected } P \quad \text{(III-70)}$$

Overall Variability Reduction Ratio Gaps $$GapP = P - \text{Selected Individual Metric from (III-64 to III-70)}. \quad \text{(III-71)}$$

The preferred embodiment of GapP is to use the Q1P, and to use the others to create intermediate gap closure goals.

It is anticipated that individual unit types will contain certain variables that the industry will find valuable to compare as averages, which will not be considered proprietary process information. Column pressure is just an example, and other average values maybe selected for other processes. In some industries, the set points might not be considered proprietary, and industry participants might be willing to share this information for comparative purposes. In such cases, the critical set points might be collected and shared by this same technique.

Calculation of Economic Values of Closing Performance Gaps

Some of the key areas where a gap economic value from equations III-8, 16, 24, 40, 48, 56, 63, and 71 can be estimated are:

Yield improvements
Energy improvements
Capacity improvements.

These improvements can be achieved in at least three ways that can be calculated from the novel metrics of this invention:

The improvement achieved by matching the control performance benchmark Vrr and/or $Vrr_i$ while making no changes in the induced variability Vi or $Vi_i$.

The improvement achieved by matching the induced variability benchmark Vi or $Vi_i$ while making no changes in the control assets performance Vrr or $Vrr_i$ The improvement achieved by matching both the induced variability benchmark Vi or $Vi_i$ and the control assets performance Vrr or $Vrr_i$ simultaneously.

Figure 5:
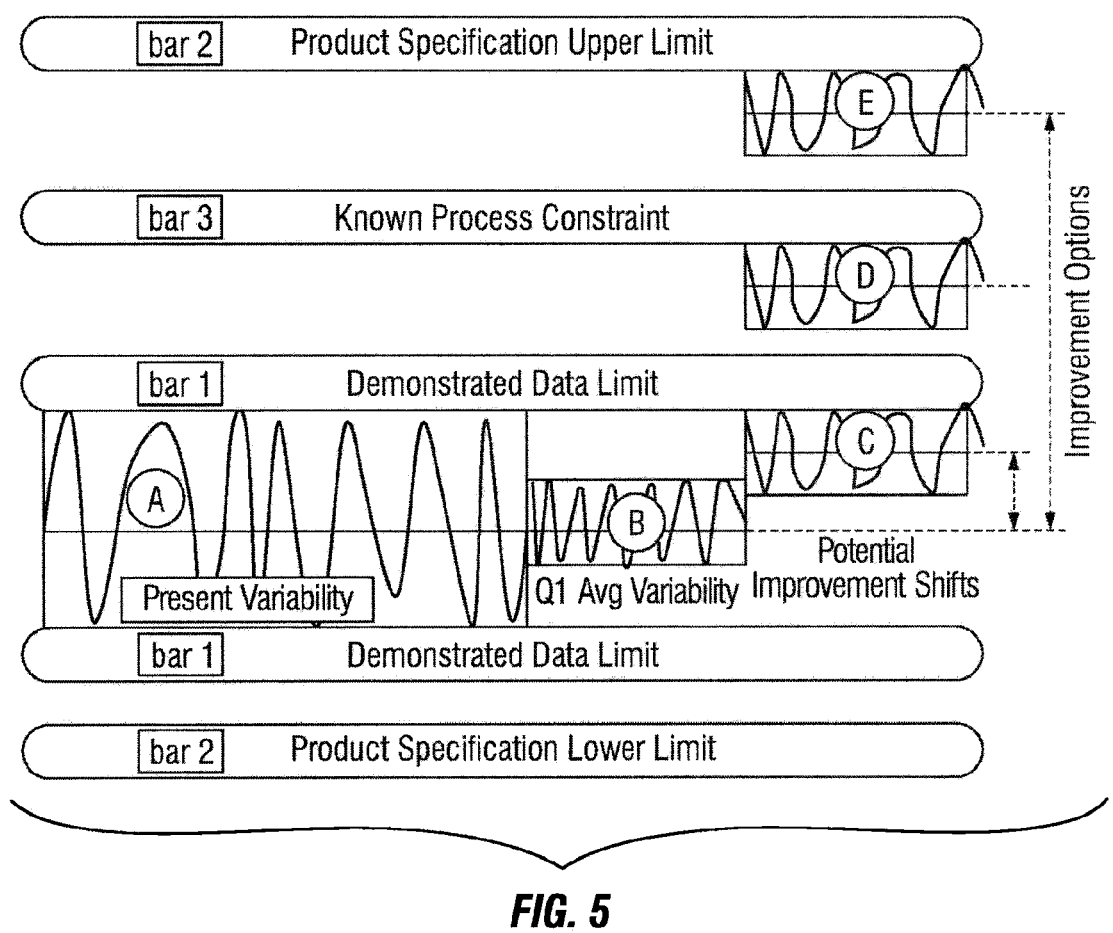
FIG. 5 is a diagram showing an embodiment of a method of analysis of process improvements by use of a variability metrics.

FIG. 5 illustrates how variability reduction can affect production yield and throughput. Time series A in FIG. 5 represents the present product variation, which varies between the demonstrated upper and lower data limits (bar 1), as dictated by the standard deviation of the data, Vo, which is calculated from the collected process data.

Time series B represents the time series benchmark generated from calculation of the benchmark achievable variation Vob, and the selected benchmark Variability Reduction Ratio benchmark Vrrb as given in the equation below:

$$Vob = \text{Max}[Vi * \text{Min}(Vrrb, Vrr), \text{Min}Vo] \quad \text{(IV-1)}$$

Where Vob=benchmark achievable standard deviation of the product measurement.
  Vi=the induced variability of the unit being analyzed
    Vrrb=the selected Vrr benchmark from equations III-57 through III-62 above
    Vrr=the variability reduction ratio for the unit being analyzed. Use of the actual value assures that if by chance the Vrr of the process is better than the benchmark, that the current performance will be used in the calculation.
    MinVo=Minimum demonstrated Vo in the population, use of the minimum in the collected industrial data assures that the numbers calculated are limited to performance that has been demonstrated to be achievable in actual industrial application. Note that the average to the three best Vo's can be used instead of the single best Vo to prevent revealing any participants actual value.

Different values may be substituted into Equation IV-1 depending on the objective of the improvement analysis:

Case 1: Analysis of the Controls Improvement
  Vi=the Vi of the unit
  Vrr=a selected benchmark value from equations III-57 through III-62 above.

Case 2: Analysis of Induced Variability Improvement
  Vi=a selected benchmark value from equations III-33 through III-39 above.
  Vrr=the Vrr of the unit.

Case 3: Analysis of Simultaneous Induced Variability and Controls Improvement
  Vi=a selected benchmark value from equations III-33 through III-39 above.
  Vrr=a selected benchmark value from equations III-57 through III-62 above.

One embodiment uses the overall unit Q1Vi, and Q1Vrr to simplify analysis, but note than a large combination of analysis are possible by substituting any combination of individual metrics and overall metrics from equations III-1 through III-63 above or values in the analysis equations. This preferred embodiment calculates the potential variation achievable if the unit process control assets performance can match that of the $1^{st}$ quartile average, and limits the potential variation to be no smaller than the smallest demonstrated variations reported by the industry data collection.

In an alternate embodiment, Vob is not calculated from Vrr and Vi as given in Equation IV-1, but instead Vob equal=is set to the average of the $1^{st}$ quartile Vo (Q1Vo from Equation III-41 above). However, this method may not be preferred, since it ignores the input variability that the unit faces. It might not be demonstrated by the industry that Q1Vo could be achieved stating with the level of induced variability the unit faces.

Referring back to FIG. 5, now that we have explained how time series B is established, we can now easily see the gap in performance. The Gap is Vo−Vob. If the unit being analyzed can match the benchmark Vob, then the time series of the process would be the same as that in time series B.

By application of the method described above we have established that time series B has been demonstrated achievable in industry. Once time series B has been achieved, the opportunity exists to move the process set point to the existing process constraints to take advantage of the lower variation and achieve an economic benefit. This is done by adjusting the set point to push time series B against the most economical constraint upper or lower bound depending on the better economics. Three types of constraints are illustrated in FIG. 5:

The demonstrated data upper and lower limit—(bar 1).
Or the product upper or lower specification constraint—(bar 2).
A known process constraint upper or lower constraint that is a hard physical constraint or a calculated constraint. Calculated constraints can include limits inferred from other outputs or inputs including combination constraints. This constraint could be directly measured or calculated by any conceivable method—(bar 3).

All of these constraint types can be used, however one preferred embodiment is the use of the "Same Limit Rule," which means that the upper and lower bounds demonstrated in the collected data for the unit are used. This is the same as the Demonstrated Data Limit in FIG. 5 (Bar 1).

The "Same Limit Rule" is preferred because its use will ensure that the economic value will be conservatively estimated, and the process is known to be able to achieve these limits because the historical data collected itself proves that to be so. This limit is illustrative and exemplary only, since any measured or calculated limit established by any method may be used.

In the refining industry, for example, the upper and lower product specifications are not likely to be achievable because the overall plant optimization LP model would have set the set points that the process runs under and the act of adjusting to the wider specification limits would defeat the overall plant optimization. Adjusting to the known process constraints is perfectly valid but requires the work to establish the actual known limits, which is not a trivial task. One method would be to communicate to the LP model the new capability demonstrated by time series B, and a new soft limit would be calculated by the LP. This would result in new bar 3 limits.

Referring back to FIG. 5, the process can now be improved by moving the set point such that the reduced variability is up against the process constraint selected for analysis, that being bar 1, bar 2, or bar 3.

If the time series represents an output quality measure such as 90% point for a product of a crude distillation unit then this shift has a known economic value at the plant and also infers a change in the volume of the product produced. If the distribution is moved upwards, then the temperature is increasing and the amount of volume of increased production can be calculated from the boiling point curve for that crude feed as given in FIG. 4.

If the time series represents a production rate, then the production rate can be increased by moving upwards to the selected constraint. In both cases, the economic value of the increased production can be calculated.

$$\text{Economic Value} = \text{increased volume} * \text{price of product} \quad \text{(IV-2)}$$

Figure 6:
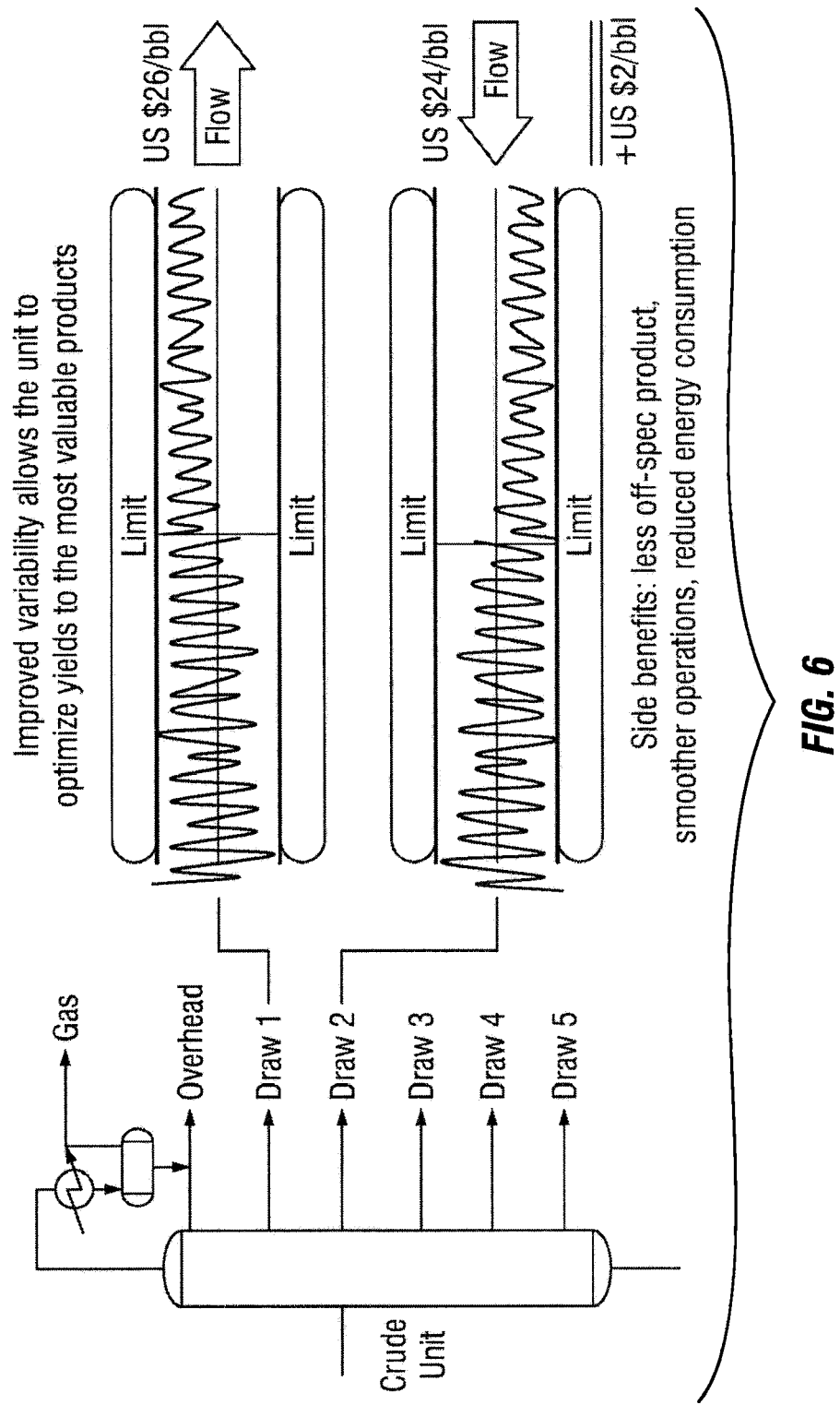
FIG. 6 is a diagram illustrating exemplary economic yield benefits that can be estimated through the use of the novel metrics of the disclosed embodiments.

In the case of a distillation unit, unless the overall throughput is increased, then the improvement represents a yield improvement to a more valuable product. Referring to FIG. 6, reduced variability results in an increase in production of a more valuable product over a less valuable product.

$$\text{Economic Value} = \text{Increase in draw 1} * (\text{price draw 1} - \text{price draw 2}) \quad \text{(IV-3)}$$

Figure 7:
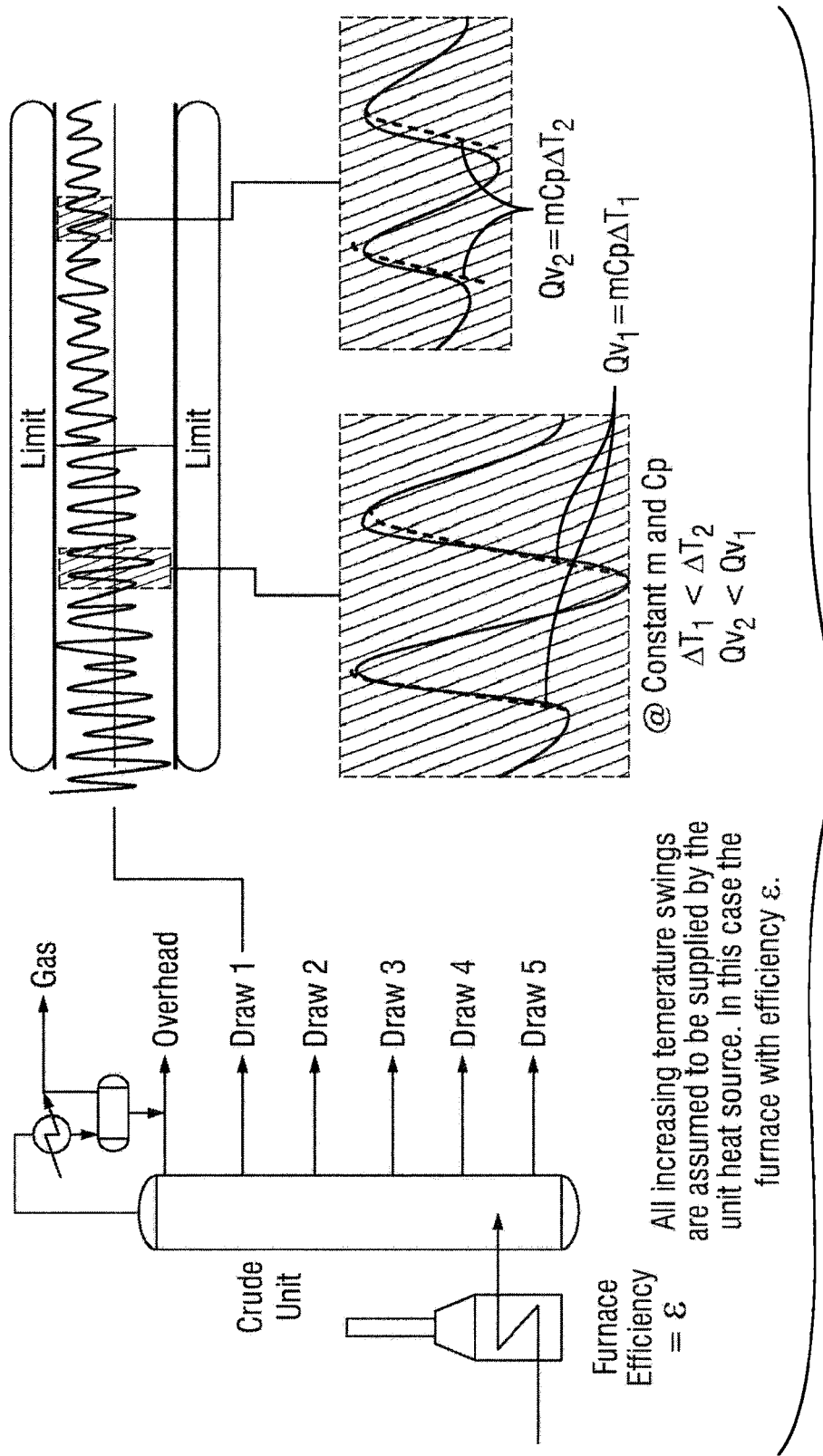
FIG. 7 is a diagram illustrating exemplary economic energy benefits that can be estimated through the use of the novel metrics of the disclosed embodiments.

An energy savings can be calculated directly from a reduction in the temperature variations of the individual column distillation product streams. FIG. 7 illustrates the basic concepts. All upward swings in the variation of the temperature of the column products are assumed to require the addition of heat into the unit. In the illustrated case, the heat source is a fired furnace with efficiency $\mathcal{E}$.

$$\text{Energy Savings Value} = \Sigma_i([0.5 m_i Cp_1(6\sigma T_{11} - 6\sigma T_{21})]/\mathcal{E}) \quad \text{(IV-4)}$$

Where P=price of energy in economic unit per unit of mass

1=stream identifier . . . 1 can be just the side streams from a distillation unit, or can encompass all exit streams from the unit, or any subset being analyzed.

$\Sigma_1$=summation over all selected streams 1 to i $€$ =unit heat source efficiency factor. In refining this is the efficiency of the unit fired heater. However the general form of equation IV-4 allows $€$ to represent the efficiency of any unit heat source.

$m_1$=mass flow or stream 1.

$Cp_1$=heat capacity of stream 1

$\sigma T_{11}$=standard deviation of temperature of column product stream 1 as measured in the observation data.

$\sigma T_{21}$=standard deviation of temperature benchmark selected from the individual output variation benchmark equations III-9 through III-15 above.

Equation IV-4 is the preferred embodiment. However, depending on the refinery control philosophy ($3\sigma$ or $2\sigma$ control limits) the constant 6 (corresponding to $3\sigma$) in equation IV-4 can be replaced with a constant value of 4 (corresponding to $2\sigma$).

The aforementioned methods of calculating quality, yield and energy improvement are illustrative and exemplary, since quality, yield, and energy improvement may be determined using other measurements and calculations.

Graphical Construct for Visualizing and Diagnosing Overall Unit Performance.

Figure 8:
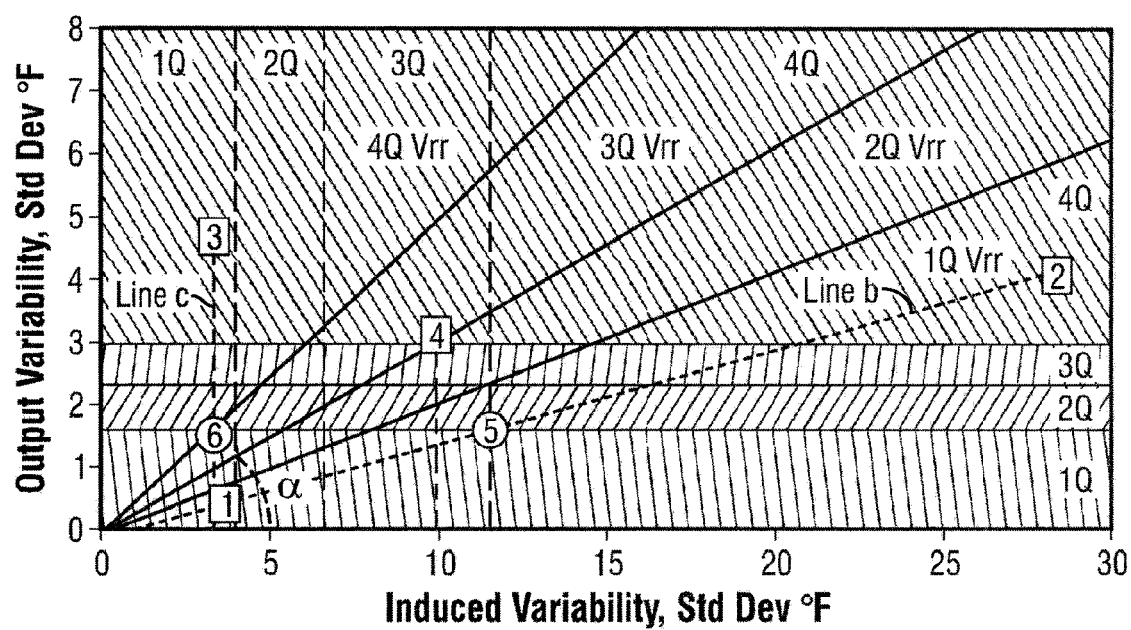
FIG. 8 is a diagram illustrating an embodiment for a crude unit of the unique Variability Graph which utilizes the novel metrics of the disclosed embodiments to easily visualize and diagnose the overall performance of crude units. Similar Variability Graphs have been reduced to practice for all major refinery process units. Similar constructions are contemplated for all major process units in all continuous and discontinuous process operations.

FIG. 8 shows a novel graphical construct according to one embodiment to display the overall performance of a unit by using the overall metrics Vo, Vi, and Vrr calculated by equations III-40, III-48, and III-63 respectively. This graphical construct will now be referred to as a "Variability Graph."

The Variability Graph is constructed for one unit type at a time. All units of the same type under analysis can be plotted on the same graph to indicate their relative performance. The example unit type selected for one embodiment is a crude distillation unit, however, similar graphic constructs can be developed for all unit types.

The X-axis of this graph is the induced variability metric, Vi, which is calculated by equation III-40. For crude units, Vi is given as the standard deviation of the side draw temperatures of the crude unit side streams in degrees F. The side stream draw temperature is a measurement of the composition of the stream, and the variation of the temperature is a measurement of the quality of the material. The induced variability represents the amount of side stream temperature variation that the input variation would cause the side stream products to have if not removed by the unit controls.

The Y-axis of this graph is the output variability metric Vo, which is calculated by equation III-48. For crude units, Vo is given as the actual standard deviation of the side draw temperatures in degrees F. as calculated from the raw observation data. Thus Vo is the key actual column control performance.

Each unit in the study can be plotted using the units Vo and Vi data points. Point 1, 2, and 3 in FIG. 8 represent the overall performance of three crude units. Since the most desirable condition is zero induced variability and zero product variability, the most desirable spot on the graph is at the origin.

The vertical dashed lines on FIG. 8 divide the X-axis axis (Vi induced variability) into four regions representing the four quartiles of Vi performance. Quartile 1 is the lowest variability and the most desirable quartile to be in. The horizontal lines on the FIG. 8 divide the Y-axis (Vo output variability) into four regions representing the four quartiles of Vo performance. Quartile 1 is the lowest variability and the most desirable quartile.

The radial diagonal lines that extend outward from the origin divide the graph space into four regions representing the four quartiles of variability reduction performance as measured by Vrr which is calculated by equation III-63. Quartile 1 is the lowest variability and the most desirable quartile.

To understand why the radial lines represent the Vrr, consider point 4 on FIG. 8, the angle $\alpha$ and the right triangle formed by the three points of the origin, point 4 and intercept of the x-axis of a line dropped straight down from point 4. The tangent of $\alpha$ is $3/10$, which is Vo/Vi. Looking at equation I-6 and I-7, it can be seen that Vr=Vo/Vi and Vrr=1−Vo/Vi. Thus, the radial lines directly represent Vr and Vrr, and also represent lines of constant controller performance over any value of induced variability recorded in the industrial data collected.

With the information conveyed by the Variability Graph, one skilled in the art can ascertain knowledge about a unit's performance by simple examination of the region of the graph where the point representing the unit's performance falls.

For example, consider Point 1 in FIG. 8. This unit is operating very well. The unit's overall performance is measured by Vo and Vo is in the $1^{st}$ quartile. The induced variability is measured by Vi, and Vi is also in the $1^{st}$ quartile. The performance of the controls is measured by the Vr and the Vrr is also in the first quartile. Point 1 is one of the very best performing units in the entire study. In fact it is in the top 0.25*0.25*0.25=1/64 of the study population.

Now we will look at Point 2 in FIG. 8. Point two is a poor overall performing unit because the main measurement of success is Vo, and the Vo of the unit is in the $4^{th}$ quartile. Looking at the Vi we can see that the induced variability of the unit is extremely high in comparison to the unit population and is in the high end of the $4^{th}$ quartile.

Previously, management might erroneously conclude that this unit represented by point 2 in FIG. 8 is in need of better process controls. An investment in expensive new control applications for the unit might be pursued. However, examination of the Vrr shows that this unit already has exceptional control performance. The Vrr is quartile 1. In fact, if extending a radial line from point 2 to the origin as is shown in FIG. 8, it passes through point 1 which represents one of the very best performing units in the industrial data. Therefore, it can be concluded that this is not a unit controls problem. This is a problem caused by excessively high induced variability in the feeds to the unit. Even the very best controller in the study could not achieve outstanding Vo results with this high an induced variability. The diagnosis then is to search out the causes of the high induced variability. This can be done by looking at the quartile ratings of the three inducing parameters (feed rate, feed temperature and feed API) from examination of the results of equation III-8.

As we improve the induced variability of the unit presented by point 2, we will be improving Vi with constant controller performance. Thus the unit performance should improve and travel down a line of constant Vrr approximated by Line b. As can be seen on the graph at point 5, if the induced variability can just be reduced to $3^{rd}$ quartile which is still higher than the study average that the overall unit performance as measured by Vo will be $1^{st}$ quartile.

Now we will examine point 3 in FIG. 8. The unit represented by point 3 is also an overall poor performer as measured by Vo which is $4^{th}$ quartile. However, examination of the induced variability shows that the unit has no excuses since the induced variability is low and in the $1^{st}$ quartile. The problem with this unit is the poor performance of the unit controls as witnessed by the poor 4$^{th}$ quartile Vrr. This unit is in need of tuning the existing controls, and potentially new control applications.

It should be noted that it has been demonstrated in industrial applications that points in the region of the graph occupied by point 3 can also have mechanical problems that prevent the unit from performing well that are independent of the controls themselves. The unit should also be checked for mechanical integrity of the column internals. If the unit is mechanically sound, then the existing controls might be poorly tuned. Units in this region of the graph often have controls that are causing more harm than good. Simply placing the offending controls in open loop might reduce output variability dramatically.

Assuming that the unit is mechanically sound, as we work to improve controller performance, the unit performance will improve and travel down a line of constant induced variability approximated by Line c. As can be seen, the unit will achieve 1$^{st}$ quartile overall performance if the controls performance measured by Vrr can just achieve 3$^{rd}$ quartile as shown by Point 6 in FIG. 8.

As previously stated, Variability Graphs have been created through this invention for all refining unit types. Some units have multiple graphs. For example, Fluid Catalytic Cracking (FCC) units typically have 5 graphs. The FCC unit can be placed on one graph showing the final products from the main fractionator. However, there is more information to be displayed for a FCC unit. The reaction section of the unit must be analyzed separately for flue gas oxygen or carbon monoxide control depending on the unit combustion mode (complete or incomplete combustion). In addition, the unit wet gas compressor or air blower controls must be analyzed separately depending on which limits unit throughput. This results in 5 Variability Graphs in the FCC analysis. This further illustrates the general use of variability graphs to analyze subparts of the process.

Additional Variability Graphs can be constructed on a stream by stream basis or for specialized portions of the unit operation. The use of the variability graphs for explaining stream-by-stream performance is illustrative and exemplary, since the graphs may be used to analyze any control system.

On-Line Real Time Analysis with the Metrics

It should be recognized that all calculations within this patent application can be automated and placed in real time monitoring and control applications to deliver process alarms, invoke expert systems or logic trees, provide feedback to control loops, and directly deliver set points.

Automated Delivery of Advice by Quartile

The division of the key metrics Vo, Vi, and Vrr developed above allow the automated delivery of advice on the performance of the unit. A combined "Performance Key" metric, Vo-Vi-Vrr, is developed by the concatenation of the three measures separated by dashes. For example, if Vo is quartile 3, and Vi is quartile 1 and Vrr is quartile 4, then the Performance Key metric Vo-Vi-Vrr would be 3-1-4. Since each measure has 4 quartiles, there are 4*4*4=64 potential values of Vo-Vi-Vrr. For each unit type a table can be built that delivers advice based on combined metric. Note that any combination of the metrics Vo and Vi can be used, as values of just Vo and Vi contain within them the value of Vrr. The addition of Vr or Vrr allows the space to be further divided into 64 regions for diagnosis.

A computer program matches the combined metric to one of the 64 options defined by the Performance Key and delivers advice appropriate for the unit performance. An example of this advice for a vacuum unit is given in Table 500. Table 500 is illustrative and exemplary, and a number of similar tables can be used for different types of units. The advice in table 500 is exemplary only, and additional or alternate advice statements can be automatically constructed. For example, the main input variables variability can be automatically compared to their quartiles to relate which of the inputs is most responsible for high induced variability.

As an example of the use of the automated advice from table 500, a Performance Key of 3-1-4 using the automated advice from Table 500 would deliver the following:

| | |
|---|---|
| Advice 1 | The overall Performance Key = 3-1-4. |
| Advice 2 | Overall unit performance is below study average. |
| Advice 3 | Poor variability reduction with controls. |
| Advice 4 | Excellent low input variability. |
| Advice 5 | Tune existing controls and consider control application improvements. |

It should be noted that additional and more detailed automated interpretation and advice could be delivered by more detailed automated analysis of any of the metrics of this invention. All are contemplated and within the scope of this invention.

Vr Vector Representation

An alternate method of analysis of a unit's performance based on the Vo and Vi is the Vr Vector Representation.

$$|Vr|=(Vo^2+Vi^2)^{0.5} \tag{V-1}$$

$$\alpha=\text{Tan}^- Vr \tag{V-2}$$

Where |Vr|=The magnitude of the Vr vector=the hypotenuse of the right triangle formed with Vo and Vi and the sides.

α=the Vr angle

Figure 10:
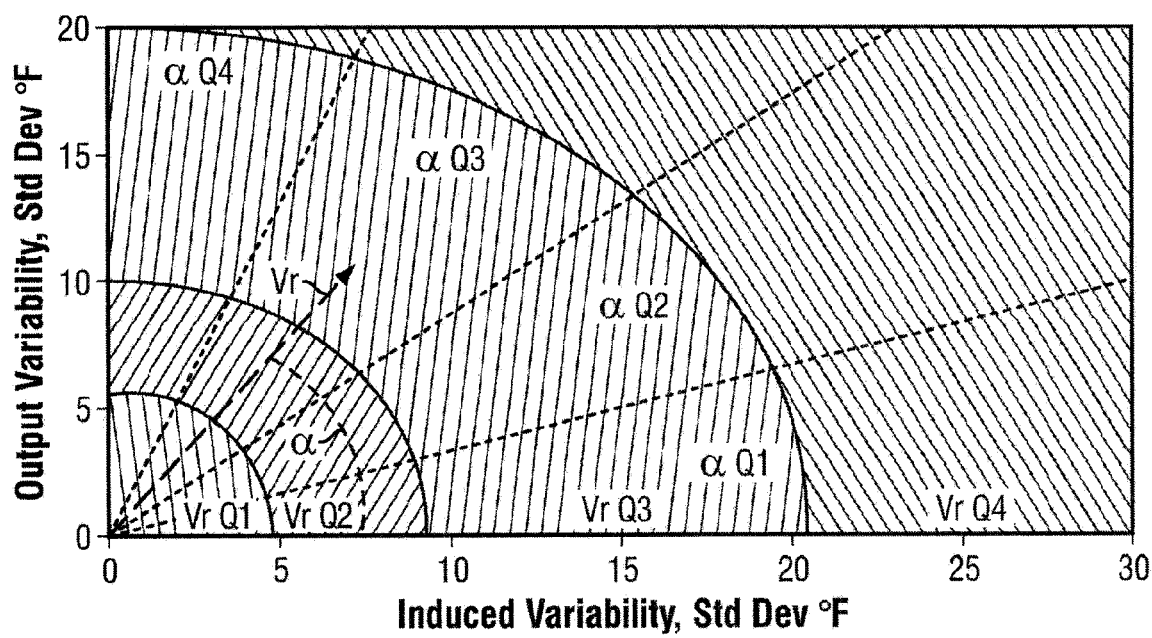
FIG. 10 is a diagram illustrating a vector representing total variability on the Variability Graph.

The Vr vector represents the total variability experienced by the unit in analysis. The larger the value |Vr| the more "shook up" the unit is. It is desirable to have lower values of |Vr|. The angle α represents the amount of variability that has been reduced by the units controls. The smaller the value of α, the more variability has been reduced. |Vr| and α can be placed into quartiles and placed into a graph similar to FIG. 8 as shown in FIG. 10. Advice similar to that in Table 500 can also be developed and delivered using |Vr| and α.

The Vr vector presents the entire performance picture in one vector. It is mathematically useful to interpret Vr in polar coordinates, for the purpose of creating generalized quartiles that replace the three quartile sets previously described with one set of quartiles.

The Vr vector interpretation provides a basis for analyzing the information contained in two vectors, such as would occur when comparing the variability performance of two similar units or the same unit at two different times (as in an on-line application). Vector algebra can be used in these cases, namely, vector addition, subtraction, and dot and cross products.

Figure 9:
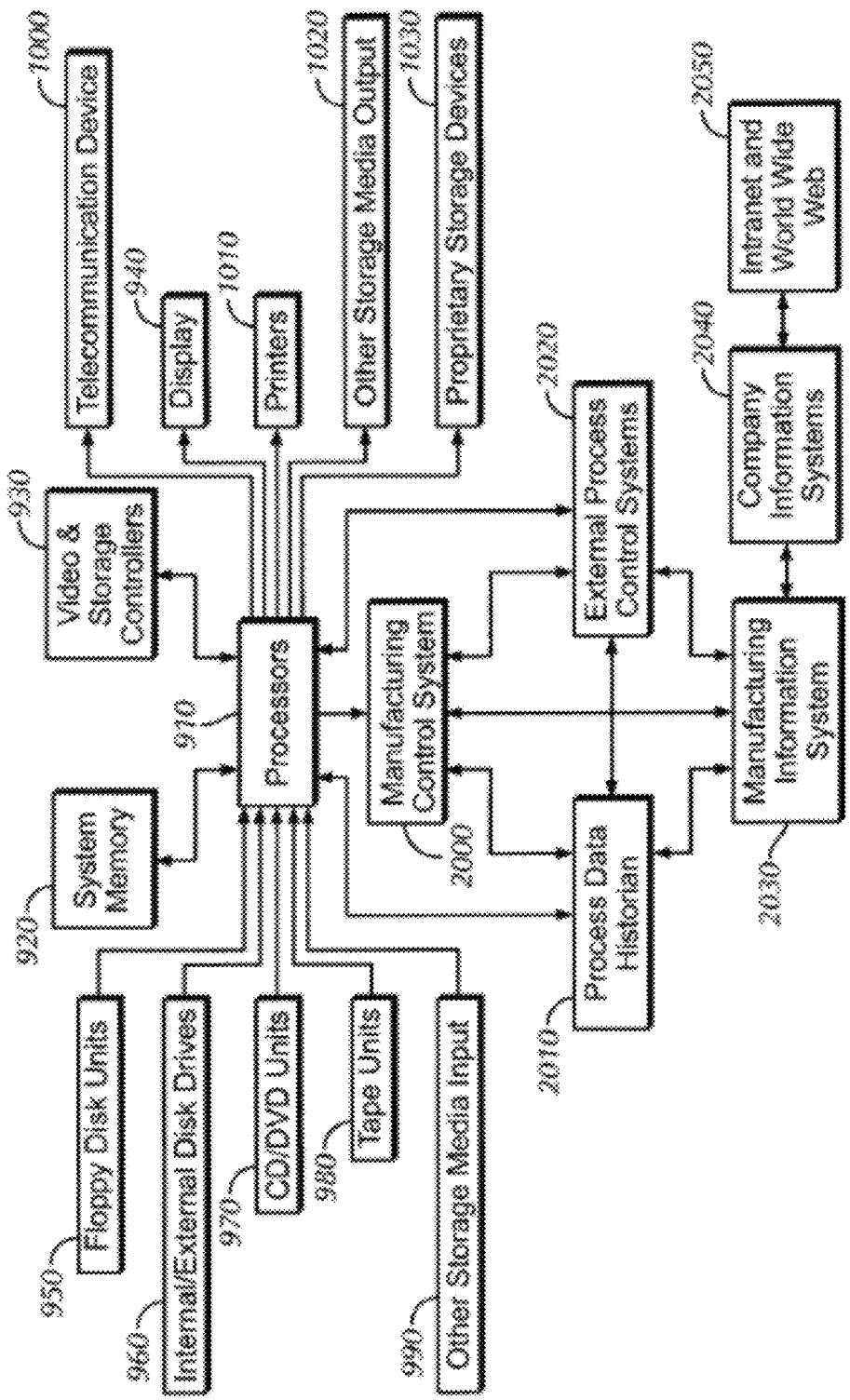
FIG. 9 is a diagram illustrating an embodiment of a system, which includes the hardware and software engines that implement the embodiment.

As shown in FIG. 9, one embodiment of a system used to perform the method includes a computing system. The hardware consists of a processor 910 that contains adequate system memory 920 to perform the required numerical computations. The processor 910 executes a computer program residing in system memory 920 to perform the method. Video and storage controllers 930 are required to enable the operation of display 940. The system includes various data storage devices for data input including floppy disk units 950, internal/external disk drives 960, internal CD/DVDs 970, tape units 980, and other types of electronic storage media 990. The aforementioned data storage devices are illustrative and exemplary only. These storage media are used to enter and store the process data frequency and loss data to the system, store the calculations, and store the system-produced analysis reports and graphs. The calculations can apply statistical software packages or can be performed from the data entered in spreadsheet formats using Microsoft Excel, for example. The analysis calculations are performed using either customized software programs designed for company-specific system implementations or by using commercially available software that is compatible with Excel or other database and spreadsheet programs. The system can also interface with proprietary or public external storage media 1030 to link with other databases to provide additional data to be applied to the performance measurement benchmarking system and method calculations. The output devices can be a telecommunication device 1000 to transmit the calculation worksheets and other system produced graphs and reports via an intranet or the Internet to management or other personnel, printers 1010, electronic storage media similar to those mentioned as input devices and proprietary storage databases 1030. These output devices are illustrative and exemplary only. If the analysis is to be performed on-line for real-time process monitoring and control, then the above system can also have additional sources of input and output.

The manufacturing control system 2000, which can include programmable logic controllers, distributed control systems, or field bus devices, would provide live data to the processors 910. It is also possible for the manufacturing control system 2000, which contains central processing systems, to take on all or part of the tasks of the processor 910. The results of the methods and calculations can be received from the processors 910 for use in real time control and alarming inside the manufacturing control system 2000.

Additional data for the method may come from the process data historian 2010, which keeps records of process variable and parameter values with time stamps and can also share any portion of the calculations performed by the processors 910. The results of the calculations from the processors 910 can also be stored in the process data historian 2010.

Input data can also be received by the processors 910 from external process control systems 2020 that reside on computers external to the manufacturing control system 2000. The results of the methods and calculations can be received from the processors 910 for use in real time control and alarming inside the external process control systems 2020.

The manufacturing information system 2030 can receive data and results from the processors 910 either directly or secondarily from the manufacturing control system 2000 the process data historian 2010 or the external process control systems 2020. This data can be used to create key performance indicators such as Vi, Vo, and Vrr for plots and written reports. Information from the manufacturing information system 2030 can be passed on to the company information systems 2040 the company intranet or world wide web 2050 for use in any conceivable purpose.

The foregoing disclosure and description of the preferred embodiments of the invention are illustrative and explanatory thereof, and various changes in the details of the illustrated system and method may be made without departing from the scope of the invention. In particular, the system can operate as a stand alone analysis method without the process data historian 2010, external process control systems 2020, manufacturing information system 2030, company information systems 2040, and company intranet or world wide web 2050. Additionally, an embodiment of the system can be on-line live by incorporating the processor 910 functions into the manufacturing control system 2000, the process data historian 2010, the external process control systems 2020, or the manufacturing information system 2030.

TABLE 100

Input Data Collected by Unit Type

| Unit Type | Input Parameters | | | | |
|---|---|---|---|---|---|
| Crude Units | Crude Flow | Crude Temp | Crude $API_{(Inferred)}$ | Furnace Outlet Temp | Column Pressure |
| Vacuum Units | ATB Flow | ATB Temp | ATB $API_{(Inferred)}$ | Furnace Outlet Temp | Column Pressure |
| FCC Units | Fresh Feed Rate | Preheat Temp | Riser Outlet Temp | $O_2$ or CO Vol % | Air or WG Flow |
| Hydrocrackers | Fresh Feed Rate | WABT | Recycle Flow | | |
| Reformers | Fresh Feed Rate | WAIT | $LHSV_{(Inferred)}$ | | |
| Hydrotreaters | Fresh Feed | WABT | $LHSV_{(Inferred)}$ | | |
| Cokers | Fresh Feed | Furnace Outlet Temp | Recycle Flow | CFR | |

TABLE 200

Output Data Collected by Unit Type

| Unit Type | Output Parameters | | | |
|---|---|---|---|---|
| Crude Units | Draw Temp of each side draw product | Draw Flow Rate of each side draw product | Bottoms Flow Rate | Bottoms Flow Temp |
| Vacuum Units | Draw Temp of each side draw product | Draw Flow Rate of each side draw product | Bottoms Flow Rate | Bottoms Flow Temp |
| FCC Units | Draw Temp of each side draw product | Draw Flow Rate of each side draw product | Bottoms Flow Rate | Bottoms Flow Temp |
| Hydrocrackers | Draw Temp of each side draw product | Draw Flow Rate of each side draw product | Bottoms Flow Rate | Bottoms Flow Temp |
| Reformers | RONC Octane Analysis | Product Flow Rate | Product Flow Temp | |
| Hydrotreaters | Draw Temp of each side draw product | Draw Flow Rate of each side draw product | Bottoms Flow Rate | Bottoms Flow Temp |
| Cokers | Draw Temp of each side draw product | Draw Flow Rate of each side draw product | Bottoms Flow Rate | Bottoms Flow Temp |

TABLE 300

Output Data Collected by Unit Type

| Unit Type | Normal-State Data | Crude-Switch or Drum-Switch Data |
|---|---|---|
| Crude Units | 24-hr datasets - 3 ea | 24-hr datasets - 3 ea |
| Vacuum Units | 24-hr datasets - 3 ea | 24-hr datasets - 3 ea |
| Reformers | 12-hr datasets - 3 ea | |
| FCC Units | 12-hr datasets - 3 ea | |
| Hydrocrackers | 12-hr datasets - 3 ea | |
| Hydrotreaters | 12-hr datasets - 3 ea | |
| Cokers | 12-hr datasets - 3 ea | 12-hr datasets - 3 ea |

TABLE 400

Example Vi Gain Matrix for a Crude Unit

| Side-Draw Stream | Crude Feed Rate °F./vol % | Furnace Inlet Temp °F./°F. | API, °F./API |
|---|---|---|---|
| LSR | 16.9 | 1.0 | 13.8 |
| Med Naphtha | 12.9 | 1.0 | 12.4 |
| Hvy Naphtha | 12.2 | 1.0 | 11.1 |
| Lt Kerosene | 11.3 | 1.0 | 9.7 |
| Kerosene | 11.2 | 1.0 | 8.4 |
| Diesel | 11.4 | 1.0 | 7.1 |
| AGO | 11.5 | 1.0 | 5.7 |
| HGO | 11.7 | 1.0 | 4.4 |
| LVGO | 12.8 | 1.0 | 3.0 |

TABLE 500

Automated Advice using the "Performance Key" derived from Vo-Vi-Vrr.

| Performance Key | Advice2 | Advice3 |
|---|---|---|
| 1-1-1 | Excellent overall performance. | Excellent variability reduction with controls. |
| 1-2-1 | Excellent overall performance. | Excellent variability reduction with controls. |
| 1-3-1 | Excellent overall performance. | Excellent variability reduction with controls. |
| 1-4-1 | Excellent overall performance. | Excellent variability reduction with controls. |
| 1-1-2 | Excellent overall performance. | Better than average variability reduction with controls. |
| 1-2-2 | Excellent overall performance. | Better than average variability reduction with controls. |
| 1-3-2 | Excellent overall performance. | Better than average variability reduction with controls. |
| 1-4-2 | Excellent overall performance. | Better than average variability reduction with controls. |
| 1-1-3 | Excellent overall performence. | Below average variability reduction with controls. |
| 1-2-3 | Excellent overall performance. | Below average variability reduction with controls. |
| 1-3-3 | Excellent overall performance. | Below average variability reduction with controls. |
| 1-4-3 | Excellent overall performance. | Below average variability reduction with controls. |
| 1-1-4 | Excellent overall performance. | Poor variability reduction with controls. |
| 1-2-4 | Excellent overall performance. | Poor variability reduction with controls. |
| 1-3-4 | Excellent overall performance. | Poor variability reduction with controls. |
| 1-4-4 | Excellent overall performance. | Poor variability reduction with controls. |
| 2-1-1 | Better than study average overall performance. | Excellent variability reduction with controls. |
| 2-2-1 | Better than study average overall performance. | Excellent variability reduction with controls. |
| 2-3-1 | Better than study average overall performance. | Excellent variability reduction with controls. |
| 2-4-1 | Better than study average overall performance. | Excellent variability reduction with controls. |
| 2-1-2 | Better than study average overall performance. | Better than average veriability reduction with controls. |
| 2-2-2 | Better than study average overall performance. | Better than average variability reduction with controls. |
| 2-3-2 | Better than study average overall performance. | Better than average variability reduction with controls. |
| 2-4-2 | Better than study average overall performance. | Better than average variability reduction with controls. |
| 2-1-3 | Better than study average overall performance. | Below average variability reduction with controls. |
| 2-2-3 | Better than study average overall performance. | Below average variability reduction with controls. |
| 2-3-3 | Better than study average overall performence. | Below average variability reduction with controls. |
| 2-4-3 | Better than study average overall performance. | Below average variability reduction with controls. |
| 2-1-4 | Better than study average overall performance. | Poor variability reduction with controls. |
| 2-2-4 | Better than study average overall performance. | Poor variability reduction with controls. |
| 2-3-4 | Better than study average overall performance. | Poor variability reduction with controls. |
| 2-4-4 | Better than study average overall performance. | Poor variability reduction with controls. |
| 3-1-1 | Overall unit performance is below study average. | Excellent variability reduction with controls. |
| 3-2-1 | Overall unit performance is below study average. | Excellent variability reduction with controls. |
| 3-3-1 | Overall unit performance is below study average. | Excellent variability reduction with controls. |
| 3-4-1 | Overall unit performance is below study average. | Excellent variability reduction with controls. |
| 3-1-2 | Overall unit performance is below study average. | Better than average variability reduction with controls. |
| 3-2-2 | Overell unit performance is below study average. | Better than average variability reduction with controls. |
| 3-3-2 | Overall unit performance is below study average. | Better than average variability reduction with controls. |
| 3-4-2 | Overall unit performance is below study average. | Better than average variability reduction with controls. |
| 3-1-3 | Overall unit performance is below study average. | Below average variability reduction with controls. |
| 3-2-3 | Overall unit performance is below study average. | Below average variability reduction with controls. |
| 3-3-3 | Overall unit performance is below study average. | Below average variability reduction with controls. |
| 3-4-3 | Overall unit performance is below study average. | Below average variability reduction with controls. |
| 3-1-4 | Overall unit performance is below study average. | Poor variability reduction with controls. |
| 3-3-4 | Overall unit performance is below study average. | Poor variability reduction with controls. |
| 3-3-4 | Overall unit performance is below study average. | Poor variability reduction with controls. |
| 3-4-4 | Overall unit performance is below study average. | Poor variability reduction with controls. |
| 4-1-1 | Overall unit performance is 4th quartile. | Excellent variability reduction with controls. |
| 4-2-1 | Overall unit performance is 4th quartile. | Excellent variability reduction with controls. |
| 4-3-1 | Overall unit performance is 4th quartile. | Excellent variability reduction with controls. |
| 4-4-1 | Overall unit performance is 4th quartile. | Excellent variability reduction with controls. |
| 4-1-2 | Overall unit performance is 4th quartile. | Better than average variability reduction with controls. |
| 4-2-2 | Overall unit performance is 4th quartile. | Better than average variability reduction with controls. |
| 4-3-2 | Overall unit performance is 4th quartile. | Better than average variability reduction with controls. |

TABLE 500-continued

Automated Advice using the "Performance Key" derived from Vo-Vi-Vrr.

| | | |
|---|---|---|
| 4-4-2 | Overall unit performance is 4th quartile. | Better than average veriability reduction with controls. |
| 4-1-3 | Overall unit performance is 4th quartile. | Below average variability reduction with controls. |
| 4-2-3 | Overall unit performance is 4th quartile. | Below average variability reduction with controls. |
| 4-3-3 | Overall unit performance is 4th quartile. | Below average variability reduction with controls. |
| 4-4-3 | Overall unit performance is 4th quartile. | Below average variability reduction with controls. |
| 4-1-4 | Overall unit performance Is 4th quartile. | Poor variability reduction with controls. |
| 4-2-4 | Overall unit performance is 4th quartile. | Poor variability reduction with controls. |
| 4-3-4 | Overall unit performance is 4th quartile. | Poor variability reduction with controls. |
| 4-4-4 | Overall unit performance is 4th quartile. | Poor variability reduction with controls. |

| Performance Key | Advice4 | Advice5 |
|---|---|---|
| 1-1-1 | Excellent low input variability. | This unit is a good candidate for RTO. |
| 1-2-1 | Good low input variability. | This unit is a good candidate for RTO. |
| 1-3-1 | Higher input variability than the study average. | Reduce input variability for additional performance. |
| 1-4-1 | Excessively high input variability. | Reduce input variability for additional performance. |
| 1-1-2 | Excellent low input variability. | This unit is a good candidate for RTO. |
| 1-2-2 | Good low input variability. | This unit is a good candidate for RTO. |
| 1-3-2 | Higher input variability than the study avenge. | Reduce input variability to improve performance. |
| 1-4-2 | Excessively high input variability. | Reduce input variability to improve performance. |
| 1-1-3 | Excellent low input variability. | Tune existing controls for improved performance. |
| 1-2-3 | Good low input variability. | Tune existing controls for improved performance. |
| 1-3-3 | Higher input variability than the study average. | Reduce input variability and tune exiting controls. |
| 1-4-3 | Excessively high input variability. | Reduce input variability for additional performance. |
| 1-1-4 | Excellent low input variability. | Tune existing controls for improved performance. |
| 1-2-4 | Good low input variability. | Tune existing controls for improved performance. |
| 1-3-4 | Higher input variability than the study average. | Tune existing controls for improved performance. |
| 1-4-4 | Excessively high input Variability. | Tune existing controls and reduce input variability. |
| 2-1-1 | Excellent low input variability. | This unit is a good candidate for RTO. |
| 2-2-1 | Good low input variability. | This unit is a good candidate for RTO. |
| 2-3-1 | Higher input variability than the study average. | Reduce input variability to improve performance. |
| 2-4-1 | Excessively high input variability. | Reduce input variability to improve performance. |
| 2-1-2 | Excellent low input variability. | This unit is a good candidate for RTO. |
| 2-2-2 | Good low input variability. | This unit is a good candidate for RTO. |
| 2-3-2 | Higher input variability than the study average. | Reduce input variability for additional performance. |
| 2-4-2 | Excessively high input variability. | Reduce input variability for additional performance. |
| 2-1-3 | Excellent low input variability. | Tune existing controls for improved performance. |
| 2-2-3 | Good low input variability. | Tune existing controls for improved performance. |
| 2-3-3 | Higher Input variability than the study average. | Reduce input variability and tune existing controls. |
| 2-4-3 | Excessively high input variability. | Reduce input variability to improve performance. |
| 2-1-4 | Excellent low input variability. | Tune existing controls for improved performance. |
| 2-2-4 | Good low input variability. | Tune existing controls for improved performance. |
| 2-3-4 | Higher input variability than the study average. | Tune existing controls for improved performance. |
| 2-4-4 | Excessively high input variability. | Tune existing controls and reduce input variability. |
| 3-1-1 | Excellent low input variability. | Factors not measured by this study are affecting performance. |
| 3-2-1 | Good low input variability. | Factors not measured by this study are affecting performance. |
| 3-3-1 | Higher input variability than the study average. | Reduce input variability to improve performance. |
| 3-4-1 | Excessively high input variability. | Reduce input variability to improve performance. |
| 3-1-2 | Excellent low input variebility. | Factors not measured by this study are affecting performance. |
| 3-2-2 | Good low input variability. | Factors not measured by this study are affecting performance. |
| 3-3-2 | Higher input variability than the study average. | Reduce input variability to improve performance. |
| 3-4-2 | Excessively high input variability. | Reduce input variability to improve performance. |
| 3-1-3 | Excellent low input variability. | Tune existing controls then consider improved control applications. |
| 3-2-3 | Good low input variability. | Tune existing controls then consider improved control applications. |
| 3-3-3 | Higher input variability than the study average. | Reduce input variability, tune existing controls, consider control applications. |
| 3-4-3 | Excessively high input variability. | Reduce input variability, tune existing controls, consider control applications. |
| 3-1-4 | Excellent low input variability. | Tune existing controls and consider control applicator improvements. |
| 3-3-4 | Good low input variability. | Tune existing controls and consider control applicator improvements. |
| 3-3-4 | Higher input variability than the study average. | Reduce input variability, tune existing controls, consider control applications. |
| 3-4-4 | Excessively high input variability. | Reduce input variability, tune existing controls, consider control applications. |
| 4-1-1 | Excellent low input variability. | Factors not measured by this study are affecting performance. |
| 4-2-1 | Good low input variability. | Factors not measured by this study are affecting performance. |
| 4-3-1 | Higher input variability than the study average. | Reduce input veriability to improve performance. |
| 4-4-1 | Excessively high input variability. | Reduce input variability to improve performance. |
| 4-1-2 | Excellent low input variability. | Factors not measured by this study are affecting performance. |
| 4-2-2 | Good low input variability. | Factors not measured by this study are affecting performance. |
| 4-3-2 | Higher input variability than the study average. | Reduce input variability for additional performance. |
| 4-4-2 | Excessively high input variability. | Reduce input variability for additional performance. |
| 4-1-3 | Excellent low input variability. | Tune existing controls then consider improved control applications. |
| 4-2-3 | Good low input variability. | Tune existing controls then consider improved control applications. |
| 4-3-3 | Higher input variability than the study average. | Reduce input variability, tune existing controls and consider control applications. |
| 4-4-3 | Excessively high input variability. | Reduce input variability, tune existing controls and consider control applications.. |
| 4-1-4 | Excellent low input variability. | Tune existing controls and consider control application improvements. |
| 4-2-4 | Good low input variability. | Tune existing controls and consider control application improvements. |
| 4-3-4 | Higher input variability than the study average. | Reduce input variability, tune existing controls and consider control applications. |
| 4-4-4 | Excessively high input variability. | Reduce input variability, tune existing controls and consider control applications. |

We claim:

1. A computer-implemented method for improving an asset's performance comprising the steps of:
    selecting a plurality of datasets of input variable values and output variable values for at least two similar production processes from different assets;
    determining, by a processor, output variability for the datasets of output variable values;
    determining, by the processor, induced variability for the datasets of output variable values;
    determining, by the processor, variability reduction ratio for the datasets of output variable values; and
    generating a gap in performance by comparing the two or more processes comparative output variability, the comparative induced variability, and the comparative reduction in variability;
    generating asset performance improvement advice based on the generated performance gaps.

2. The computer-implemented method of claim 1, wherein the variability of the selected output variable values is related to the variability of the selected input variable values.

3. The computer-implemented method of claim 1, including the additional step of:
    determining variability ratio for the datasets of output variable values.

4. The computer-implemented method of claim 1, including the additional step of:
    processing the plurality of datasets of input variable values and output variable values to remove outliers.

5. The computer-implemented method of claim 4, wherein the processing of the input variable values and the output variable values comprises:
    removing data errors.

6. A computer-implemented method for improving an asset's performance comprising the steps of:
    selecting a plurality of datasets of input variable values and output variable values;
    determining, by a processor, output variability for each of the datasets of output variable values;
    determining, by the processor, variability ratio for each of the datasets of output variable values; and
    generating asset performance improvement advice based on the variability ratio.

7. The computer-implemented method of claim 6, wherein the variability of the selected output variable values is related to the variability of the selected input variable values.

8. The computer-implemented method of claim 6, including the additional step of:
    determining variability ratio for the datasets of output variable values.

9. The computer-implemented method of claim 6, including the additional step of:
    processing the plurality of datasets of input variable values and output variable values to remove outliers.

10. The computer-implemented method of claim 9, wherein the processing of the input variable values and the output variable values comprises:
    removing data errors.

11. A computer-implemented method for improving the performance of a target unit comprising the steps of:
    selecting a plurality of process operating data for the target unit comprising input datasets and output datasets;
    processing the input and output datasets;
    estimating set points for the input and output datasets;
    calculating standard deviations for each of the input and output datasets based on the estimated set points;
    estimating a combined variability value for the input and output datasets;
    calculating, by a processor, the induced variability for each of the output datasets;
    calculating, by the processor, the variability ratio for the output datasets;
    calculating, by the processor, variability reduction ratio for the output datasets;
    calculating, by the processor, the overall variability performance for the target unit; and
    calculating the overall variability reduction ratio for the target unit.

12. The computer-implemented method of claim 11, wherein the target unit is a refinery industry unit.

13. The computer-implemented method of claim 11, wherein the input datasets comprise at least one inferred value.

14. A system for improving an asset's performance comprising:
    a server, comprising:
        a processor, and
        a storage subsystem;
    a database stored by the storage subsystem comprising:
        datasets of input variable values and output variable values for at least two processes associated with the asset;
    a computer program stored by the storage subsystem, when executed causing the processor to:
        select a plurality of datasets of input variable values and output variable values;
        determine output variability for the datasets of output variable values;
        determine induced variability for the datasets of output variable values;
        determine variability reduction ratio for the datasets of output variable values; and
        generate asset performance improvement advice based on the output variability, the induced variability, and the reduction in variability.

15. The system of claim 14, wherein the variability of the selected output variable values is related to the variability of the selected input variable values.

16. The system of claim 14, wherein the computer program, when executed, further causes the processor to:
    calculate variability ratio for the datasets of output variable values.

17. The system of claim 14, wherein the computer program, when executed, further causes the processor to:
    process the plurality of datasets of input variable values and output variable values to remove outliers.

18. The system of claim 17, wherein the processing of the input variable values and the output variable values comprises:
    removal of data errors.

19. A system for improving a process control asset's performance comprising:
    a server, comprising:
        a processor, and
        a storage subsystem;
    a database stored by the storage subsystem comprising:
        datasets of input variable values and output variable values for at least two processes associated with the asset;
    a computer program stored by the storage subsystem, when executed causing the processor to:
        select a plurality of datasets of input variable values and output variable values;
        determine output variability for each of the datasets of output variable values;

determine variability ratio for each of the datasets of output variable values; and generate asset performance improvement advice based on the output variability and the variability ratio.

20. The system of claim 19, wherein the variability of the selected output variable values is related to the variability of the selected input variable values.

21. The system of claim 19, wherein the computer program, when executed, further causes the processor to:

calculate variability ratio for the datasets of output variable values.

22. The system of claim 19, wherein the computer program, when executed, further causes the processor to:

process the plurality of datasets of input variable values and output variable values to remove outliers.

23. The system of claim 22, wherein the processing of the input variable values and the output variable values comprises:

removal of data errors.

* * * * *